(12) United States Patent
Maruyama et al.

(10) Patent No.: US 7,522,485 B2
(45) Date of Patent: Apr. 21, 2009

(54) METHOD FOR ADJUSTING FOCUS OR TRACKING DETECTION UNIT, AND OPTICAL DISC DEVICE

(75) Inventors: Tooru Maruyama, Ibaraki (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 657 days.

(21) Appl. No.: 11/110,833

(22) Filed: Apr. 21, 2005

(65) Prior Publication Data

US 2005/0237873 A1  Oct. 27, 2005

(30) Foreign Application Priority Data

Apr. 23, 2004 (JP) ............................. 2004-127801

(51) Int. Cl.
*G11B 7/00* (2006.01)
(52) U.S. Cl. ................. 369/44.29; 369/44.23
(58) Field of Classification Search ........................ None
See application file for complete search history.

(56) References Cited

U.S. PATENT DOCUMENTS 6,324,133 B1 * 11/2001 Ichimura ................. 369/44.27
6,934,226 B2 * 8/2005 Yasuda et al. ............ 369/44.23
7,307,927 B2 * 12/2007 Fujita et al. .............. 369/44.29
7,327,642 B2 * 2/2008 Yamada et al. ........... 369/44.29
2002/0195540 A1 12/2002 Higuchi

FOREIGN PATENT DOCUMENTS

| EP | 1 357 548 | 10/2003 |
| JP | 2002-170259 | 6/2002 |
| JP | 2003-99970 | 4/2003 |

* cited by examiner

*Primary Examiner*—Peter Vincent Agustin
(74) *Attorney, Agent, or Firm*—Wenderoth, Lind & Ponack, L.L.P.

(57) ABSTRACT

An optical disc device comprises a spherical or coma aberration correction unit to pre-correct spherical or coma aberration occurring in the light beam, a focus or tracking detection unit operable to detect a focus or tracking error signal, and an FE or TE amplitude adjustment unit operable to adjust the signal amplitude of the focus or tracking detection unit to a specific value after the amount of spherical or coma aberration has been matched to a specific value by the spherical or coma aberration correction unit.

13 Claims, 24 Drawing Sheets

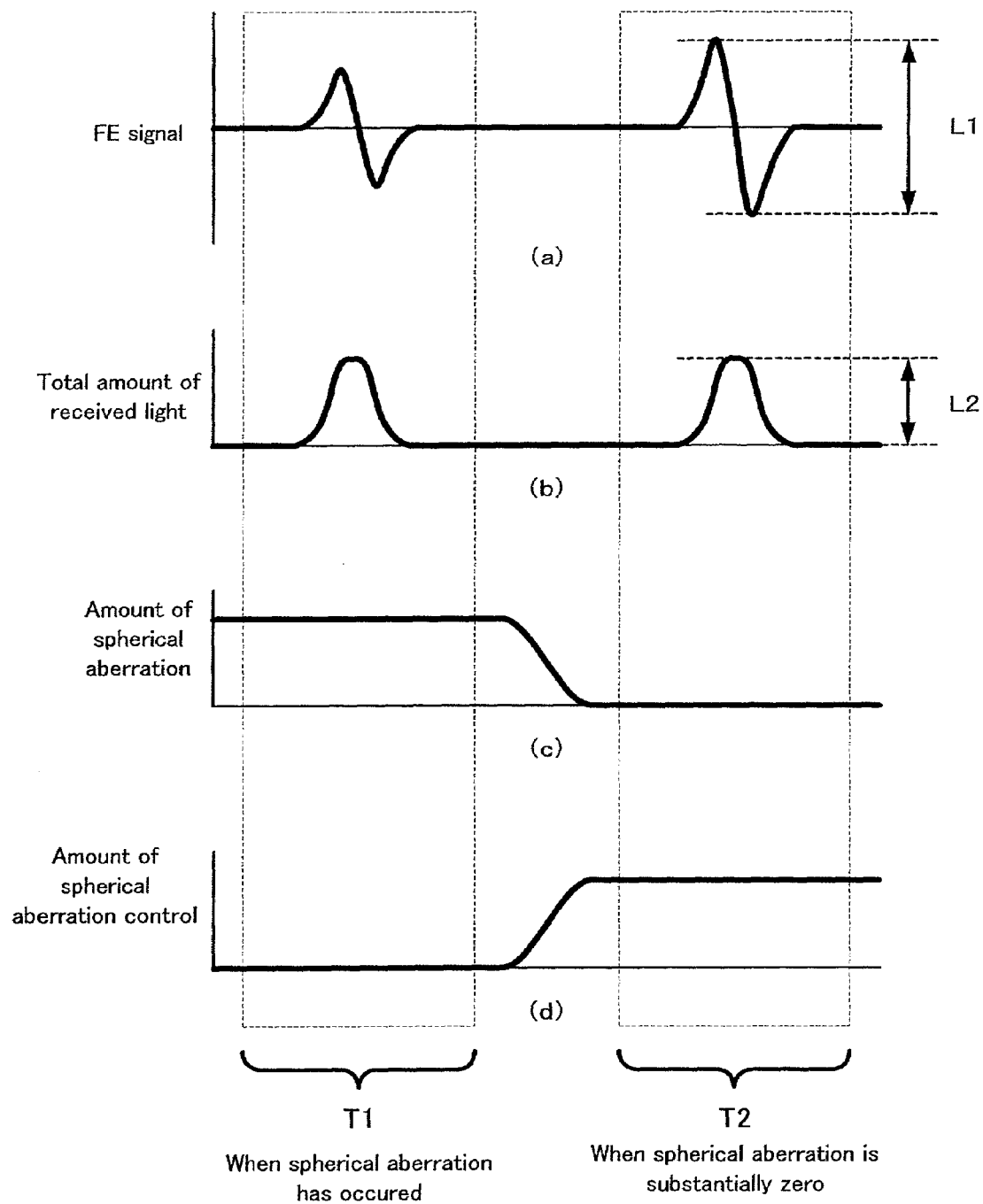
PRIOR ART  Fig. 20

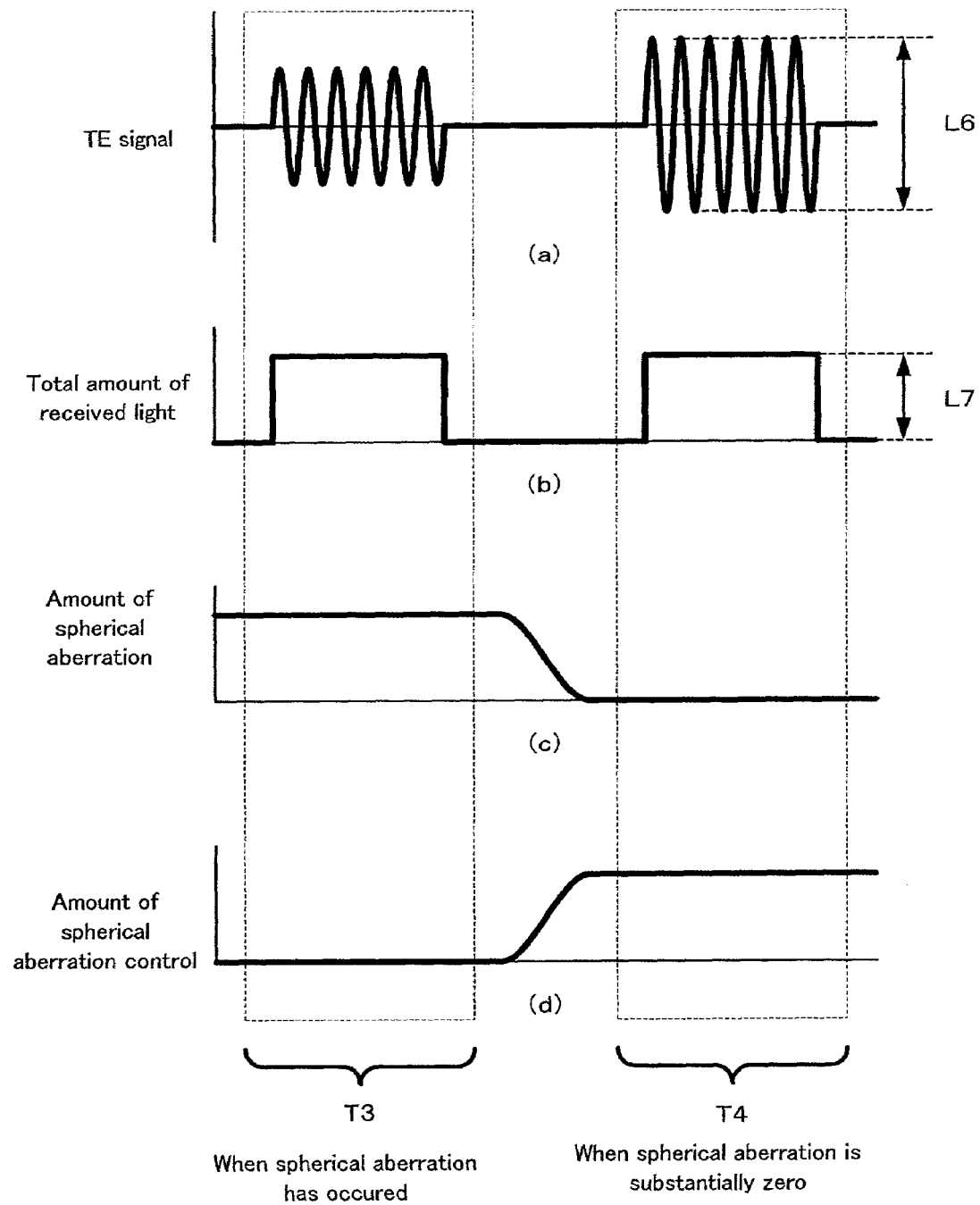
PRIOR ART  Fig. 21

METHOD FOR ADJUSTING FOCUS OR TRACKING DETECTION UNIT, AND OPTICAL DISC DEVICE

BACKGROUND OF THE INVENTION

1. Field of the Invention

The present invention relates to a method for adjusting focus or tracking detection unit, and an optical disc device.

2. Background Information

Write-once and rewritable optical disc devices have become commonplace today. Microscopic tracks are provided in a spiral or concentric pattern on the optical discs used in these devices, and information is recorded on these tracks. To record information to the tracks or read information from the tracks, a light beam has to be controlled so that it is always located over the information tracks.

It is also necessary to correct deviation of the laser beam with respect to the recording surface due to axial runout of the optical disc, radial runout of the rotary axis of the turntable, or the like, so that the focal point of the laser beam precisely follows the recording surface of the optical disc.

FIG. 23 is a diagram illustrating the constitution of a conventional optical disc device. An optical irradiation unit 3 in FIG. 23 directs a light beam 2 at an optical disc 1 and irradiates the disc at a specific power. The irradiating light beam 2 passes through a beam splitter 5 and is focused by a focusing lens 4 on the information surface of the optical disc 1. The light beam 2 reflected by the optical disc 1 is directed by the beam splitter 5 to a light receiver 6. The light receiver 6 outputs the amount of received light as a signal. An optical head 7 is made up by the optical irradiation unit 3, the focusing lens 4, the beam splitter 5, and the light receiver 6. A focus error detector 10 detects a focus error signal (hereinafter referred to as FE signal) on the basis of the signal from the light receiver 6. The FE signal expresses runout between the focal position of the optical spot and the information signal recording surface of the optical disc. A total received light detector 12 detects the reflected light sum signal (hereinafter referred to as an AS signal) on the basis of the signal from the light receiver 6. A correction coefficient calculator 13 calculates a correction coefficient that is the ratio of the FE signal amplitude to the total amount of received light. When the total amount of received light changes, an automatic amplitude controller 14 (AGC circuit) automatically controls the amplitude of the FE signal based on the amount of change and the correction coefficient. More specifically, the automatic amplitude controller 14 outputs a value obtained by multiplying the basic gain by the quotient of dividing the FE signal by the AS signal. As a result, the FE signal amplitude is kept at a specific level even though the disc reflectivity may vary or there may be variance in the power of the light beam. This is because the FE signal and the AS signal are both generally proportional to the intensity of the light reflected from the disc.

A tracking error detector 11 detects a tracking error signal (hereinafter referred to as TE signal) on the basis of the signal from the light receiver 6. The TE signal is information about positional deviation in the track width direction of an optical pickup with respect to the pits. Just as with the FE signal, the total received light detector 12 detects the total amount of received light on the basis of the signal from the light receiver 6, and the correction coefficient calculator 13 calculates a correction coefficient that is the ratio of the TE signal amplitude to the total amount of received light. When the total amount of received light changes, the automatic amplitude controller 14 automatically controls the amplitude of the TE signal based on the amount of change and the correction coefficient. As a result, the FE signal amplitude is kept at a specific level even though there may be variance in the disc reflectivity or the power of the light beam. This is because the TE signal and the AS signal are both generally proportional to the intensity of the light reflected from the disc.

There has also been a proposal for a device that adjusts the amplitude of the FE signal or the TE signal when the amount of light reflected from an optical disc varies between tracks or between recording layers (see Japanese Laid-Open Patent Application 2002-170259, for example).

In addition, a device has been proposed in which attention is turned to the fact that changes in the FE signal are also caused by spherical aberration, and spherical aberration is imparted prior to focus pull-in, thereby increasing the slope of the S curve of the FE signal, allowing the amplitude thereof to be increased, and affording more reliable focusing (see Japanese Laid-Open Patent Application 2003-99970, for example).

With recently disclosed high-density optical disc devices that make use of blue lasers of about 405 nm, because of the short wavelength, considerable coma aberration occurs in the spot on the optical disc as a result of disc tilt. For example, compared to the red laser of a DVD, there is roughly 1.6 times as much coma aberration. Furthermore, when an objective lens with a large NA of 0.85 is used for narrowing the beam in addition to a blue laser, considerable spherical aberration occurs in the spot on the optical disc as a result of variance in the light transmitting layer thickness. For instance, compared to a lens of NA of 0.6, such as with a DVD, there is roughly 10 times as much spherical aberration.

Spherical aberration occurs when the actual light transmitting layer thickness of an optical disc deviates from the ideal light transmitting layer thickness that is used as a predetermined reference in the design of an optical head. As shown in FIGS. 20 and 21, when aberration occurs in the light spot on an optical disc, the detection sensitivity (that is, the amplitude or slope) of the FE signal or TE signal varies, but there is almost no change in the level of the AS signal. Therefore, when an automatic amplitude controller (AGC circuit) is constituted by a division circuit or the like as in the past, there is fluctuation in the level of the various outputs for focus and tracking AGC, and the gain of the focus control system and tracking control system fluctuates. In general, sensitivity and amplitude drop, so there is a decrease in gain, and in a worst case, focus control or tracking control deviate in a state in which the automatic amplitude controller (AGC circuit) has been actuated. Conversely, if the spherical aberration is corrected to be approximately zero after the adjustment of the loop gain of focus and tracking, the same problems as those encountered with the above-mentioned spherical aberration will occur with coma aberration depending on the configuration of the optical system or the direction, amount, and phase of the coma aberration that occurs.

Furthermore, although the focus or tracking error signal is adjusted or loop gain is adjusted under the condition that the spherical aberration is small, in the two-layer disc or multilayer disc, after the light beam moves between the layers, a big spherical aberration corresponding to difference of the light transmitting layer thickness occurs. Until the spherical aberration correction element sufficiently follows the spherical aberration, the gains of the focus and tracking lowers so that the focus or tracking control deviates on the information surface of the layer to which the light beam moved.

In light of the above situation, it is an object of the present invention to provide an optical disc device that allows automatic amplitude control capable of ensuring focus and tracking performance that will always remain stable even when spherical aberration or coma aberration occurs, and affords stable high functionality and reliability with both two-layer discs and multilayer discs.

SUMMARY OF THE INVENTION

According to a first aspect of the present invention, a method for adjusting a focus or tracking detection unit is used in an optical disc device that performs recording and reproduction by directing a light beam at the information surface of an information medium that has been surface coated with a light transmitting layer. The optical disc device comprises an aberration correction unit operable to pre-correct spherical or coma aberration occurring in the light beam, and a focus or tracking detection unit operable to detect a focus or tracking error signal. The method comprises processes of matching the amount of spherical or coma aberration to a specific value by means of the spherical or coma aberration correction unit and then adjusting the signal amplitude of the focus or tracking detection unit to a specific value.

According to a second aspect of the present invention, an optical disc device that performs recording and reproduction by directing a light beam at the information surface of an information medium that has been surface coated with a light transmitting layer, comprises a spherical or coma aberration correction unit to pre-correct spherical or coma aberration occurring in the light beam, a focus or tracking detection unit operable to detect a focus or tracking error signal, and an FE or TE amplitude adjustment unit operable to adjust the signal amplitude of the focus or tracking detection unit to a specific value after the amount of spherical or coma aberration has been matched to a specific value by the spherical or coma aberration correction unit.

According to a third aspect of the present invention, an optical disc device that performs recording and reproduction by directing a light beam at the information surface of an information medium that has been surface coated with a light transmitting layer, comprises a spherical or coma aberration correction unit operable to pre-correct any spherical or coma aberration occurring in the light beam, a focus or tracking detection unit operable to detect a focus or tracking error signal, a total optical quantity detection unit operable to detect a signal corresponding to the total quantity of light from an optical disc; and an amplitude control unit operable to control the amplitude of the focus or tracking detection unit to a specific value on the basis of the signal from the total optical quantity detection unit. The amplitude control unit is actuated after correction with the spherical or coma aberration correction unit when the device is turned on.

According to a fourth aspect of the present invention, an optical disc device that performs recording and reproduction by directing a light beam at the information surface of an information medium that has been surface coated with a light transmitting layer, comprises a spherical or coma aberration correction unit operable to pre-correct any spherical or coma aberration occurring in the light beam, a focus or tracking detection unit operable to detect a focus or tracking error signal, a focus or tracking control unit operable to control such that the light beam will be in a specific state on the information surface on the basis of the signal from the focus or tracking detection unit; and a focus or tracking gain adjustment unit operable to measure and adjust the loop gain of the focus or tracking control unit. The focus or tracking gain adjustment unit is actuated after correction with the spherical or coma aberration correction unit when the device is turned on.

Preferably, the optical disc device further comprises a storage unit for storing a value corresponding to the amount of spherical or coma aberration and used for matching. The spherical or coma aberration correction unit corrects spherical or coma aberration on the basis of the value read from the storage unit when the device is turned on.

Preferably, the optical disc device further comprises a reproduction signal amplitude detection unit operable to detect the amplitude of an information reproduction signal that has already been recorded on the information medium. The spherical or coma aberration correction unit corrects spherical or aberration such that the signal from the reproduction signal amplitude detection unit will be substantially at is maximum when the device is turned on.

Preferably, the optical disc device further comprises a reproduction signal jitter detection unit operable to detect jitter in an information reproduction signal that has already been recorded on the information medium. The spherical or coma aberration correction unit corrects spherical or coma aberration such that the signal from the reproduction signal jitter detection unit will be optimized when the device is turned on.

Preferably, the optical disc device further comprises a binarization unit operable to binarize an information reproduction signal that has already been recorded on the information medium, and an error detection unit operable to detect a bit error in the binarized reproduction signal, or a signal corresponding to this bit error. The spherical or coma aberration correction unit corrects spherical or coma aberration on the basis of the signal from the error detection unit when the device is turned on.

Preferably, with a multilayer disc having two or more layers of stacked information surfaces, the correction of spherical or coma aberration is performed by the spherical or coma aberration correction unit for each layer.

Preferably, the spherical aberration correction unit pre-corrects spherical or coma aberration when the device is turned on, such that the signal amplitude of the error detection unit is substantially at its maximum.

According to a fifth aspect of the present invention, an optical disc device for recording and reproduction on an information medium has two or more layers of information surfaces. An amplitude adjustment unit operable to adjust the amplitude of a tracking error signal or a focus error signal to a specific amplitude is held until the amount of spherical or coma aberration occurring in a light beam during movement to the various layers falls within a specific range.

With the optical disc device according to the present invention, after the amount of spherical aberration or coma aberration has been matched to a specific value when the device is turned on:

1) the focus error signal or tracking error signal amplitude is adjusted to a specific value, 2) the focus error signal or tracking error signal amplitude is controlled to a specific value on the basis of an overall light quantity detection signal, or 3) the loop gain of a focus or tracking control means is measured and adjusted.

Accordingly, the FE signal amplitude or TE signal amplitude can be held at the desired level. Also, an even more stable servo system can be constructed by applying the actuation sequence of the present invention, namely, amplitude adjustment, loop gain adjustment, and spherical aberration correction.

Also, if the automatic amplitude control is switched on after the optical disc device of the present invention has undergone correction of spherical aberration during interlayer movement, proper spherical aberration correction and focus and tracking control can be realized for both two-layer discs and multilayer discs.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 20 is a waveform diagram illustrating the waveforms of the FE signal amplitude the total amount of received light when spherical aberration is occurring and when the amount of spherical aberration is substantially zero;

FIG. 21 is a waveform diagram illustrating the waveforms of the TE signal amplitude the total amount of received light when spherical aberration is occurring and when the amount of spherical aberration is substantially zero;

DETAILED DESCRIPTION OF THE PREFERRED EMBODIMENTS

Examples of the present invention will now be described.

Embodiment 1

Figure 1:
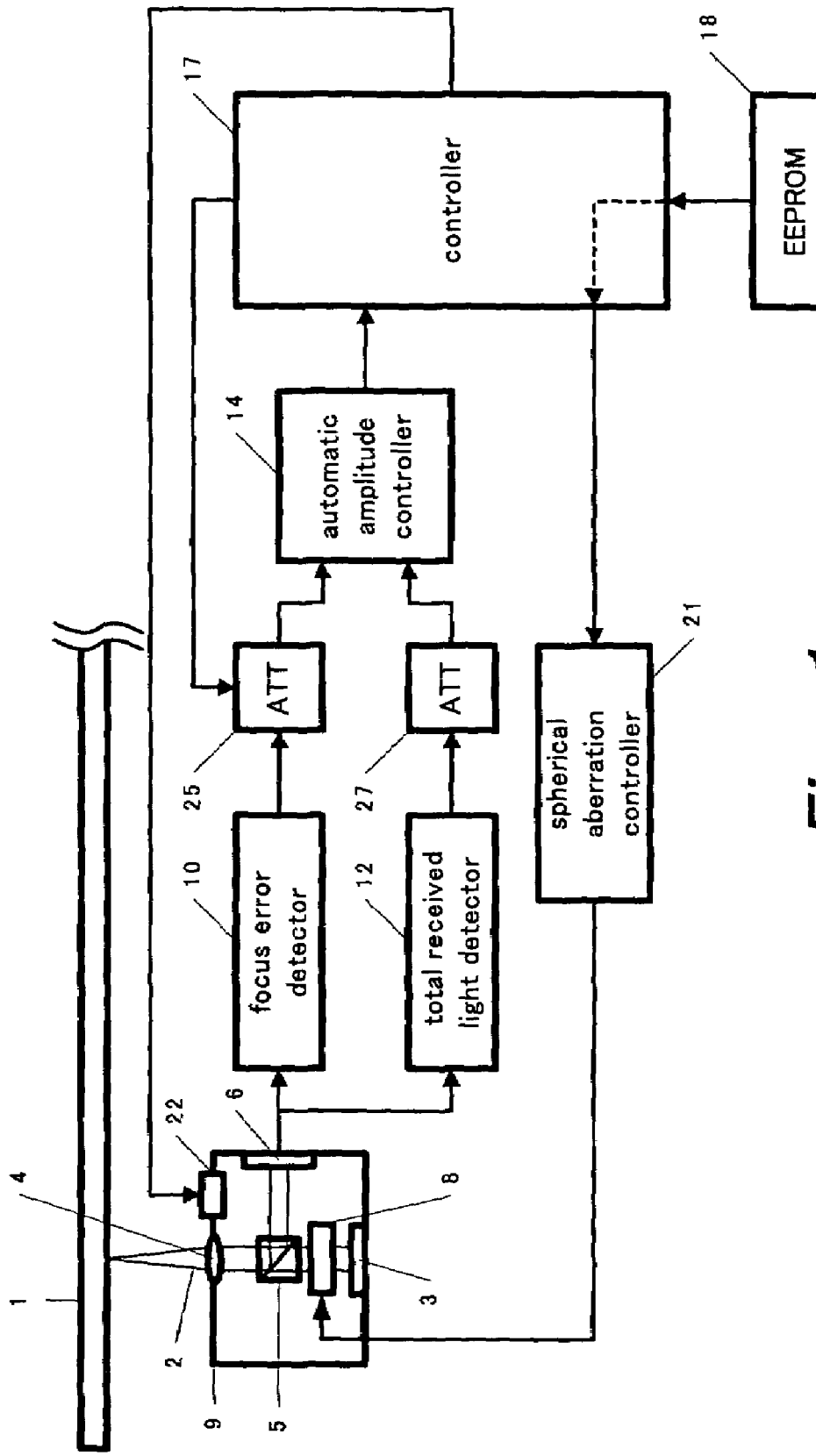
FIG. 1 is a block diagram of the constitution of Embodiment 1.

A first embodiment will be described through reference to FIGS. 1 and 20. FIG. 1 is a block diagram of the constitution of this embodiment, while FIG. 20 is a waveform diagram illustrating the waveforms of the total amount of received light and the FE signal amplitude when the amount of spherical aberration was roughly zero and when spherical aberration had occurred.

In FIG. 1, the optical irradiation unit 3 directs a light beam 2 at an optical disc 1 and irradiates the disc at a specific power. The irradiating light beam 2 passes through the beam splitter 5 and is focused by the focusing lens 4 on the information surface of the optical disc 1. The light beam 2 reflected by the optical disc 1 is directed by the beam splitter 5 to the light receiver 6. The light receiver 6 outputs the amount of received light as a signal. An optical head 9 is made up of the optical irradiation unit 3, the focusing lens 4, the beam splitter 5, the light receiver 6, and a spherical aberration element 8. The focus error detector 10 detects a focus error signal (hereinafter referred to as FE signal) on the basis of the signal from the light receiver 6. The total received light detector 12 detects the total amount of received light on the basis of the signal from the light receiver 6. The signals from the focus error detector 10 and the total received light detector 12 are outputted through ATTs 25 and 27, respectively, to the automatic amplitude controller 14. When the total amount of received light changes, the automatic amplitude controller 14 automatically controls the amplitude of the FE signal based on the amount of change. That is, the automatic amplitude controller 14 controls such that the light beam will be in a specific focal state on the information surface on the basis of the signal from the focus error detector 10. As a result, the FE signal amplitude is kept at a specific level even though the disc reflectivity may vary or there may be variance in the power of the light beam. The signal from the automatic amplitude controller 14 is inputted to a controller 17. The controller 17 is able to control a focus actuator 22, the ATT 25, and a spherical aberration controller 21.

An EEP ROM (Electrically Erasable Programmable ROM) 18 can be read from the controller 17. In this EEP ROM 18 is stored, for example, a drive value determined such that when a specific optical disc of a known light transmitting layer thickness is used during the adjustment and test of the device, the spherical aberration that can occur at that light transmitting layer thickness will be substantially zero. (For example, the light transmitting layer thickness of the specific optical disc is preferably 100 or 75 µm.)

Since spherical aberration is proportional to the inverse of the wavelength and the fourth power of the NA, large spherical aberration occurs as a result of even microscopic unevenness in the light transmitting layer thickness.

Thus, as shown in FIG. 1, it is necessary to drive the spherical aberration element 8 and adjust the spherical aberration so as to match the light transmitting layer thickness of the disc. Accordingly, when the device is turned on, or when a specific command is issued from the host (not shown), the controller 17 acquires the drive value of the spherical aberration element 8 from the EEP ROM 18, and drives the spherical aberration element 8 to the specified position via the spherical aberration controller 21 (step S1 in FIG. 2). The amount of spherical aberration (that is, the drive value) is 100 µm, which is the light transmitting layer thickness of the disc. Thus, the amount of spherical aberration of the light beam 2 emitted by the irradiation unit 3 is corrected according to the output of the spherical aberration controller 21.

Figure 2:
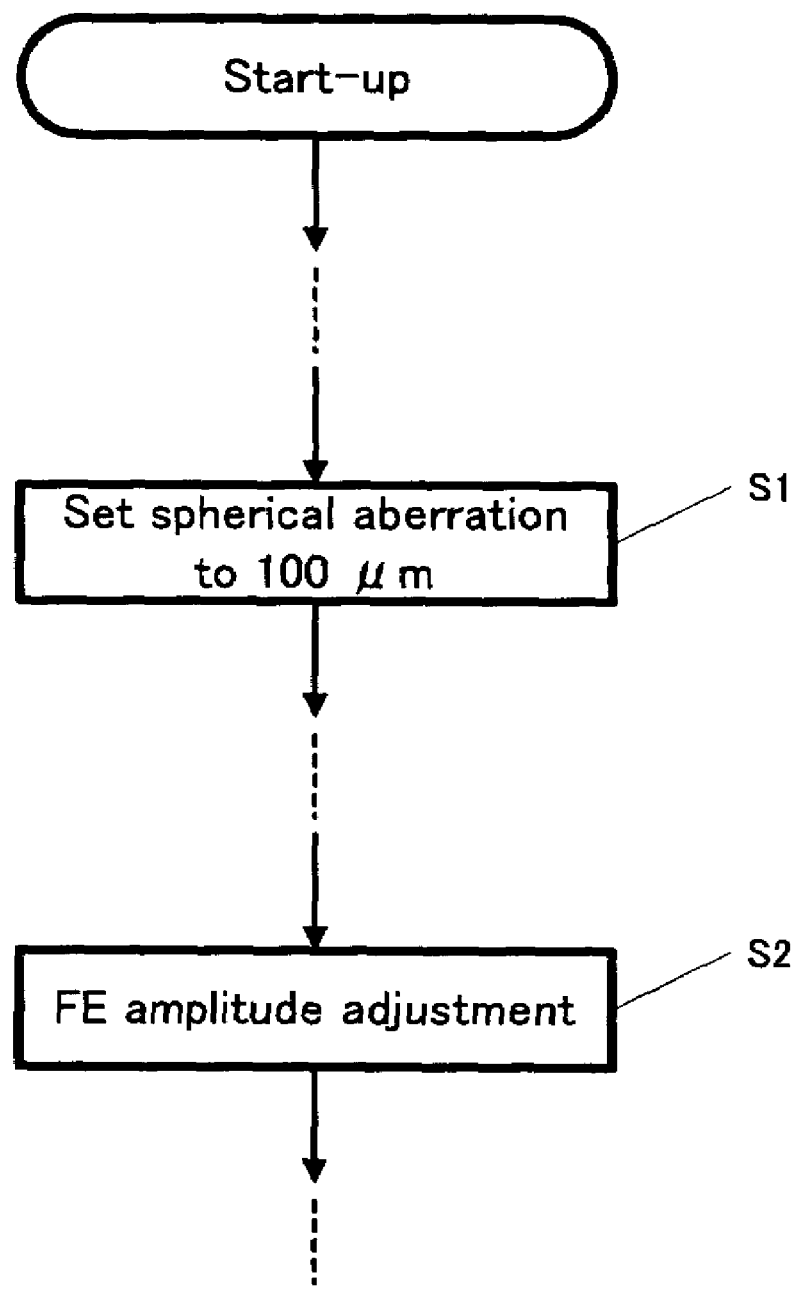
FIG. 2 is a flowchart illustrating the operation of the controller 17.

Next, the controller 17 sets the ATT 25 so that the signal from the focus error detector 10 will have a constant amplitude regardless of the reflectivity of the disc 1 (step S2 in FIG. 2).

A modification of the first embodiment, in which no EEP ROM is used, will now be described.

First Modification of Embodiment 1

Figure 4:
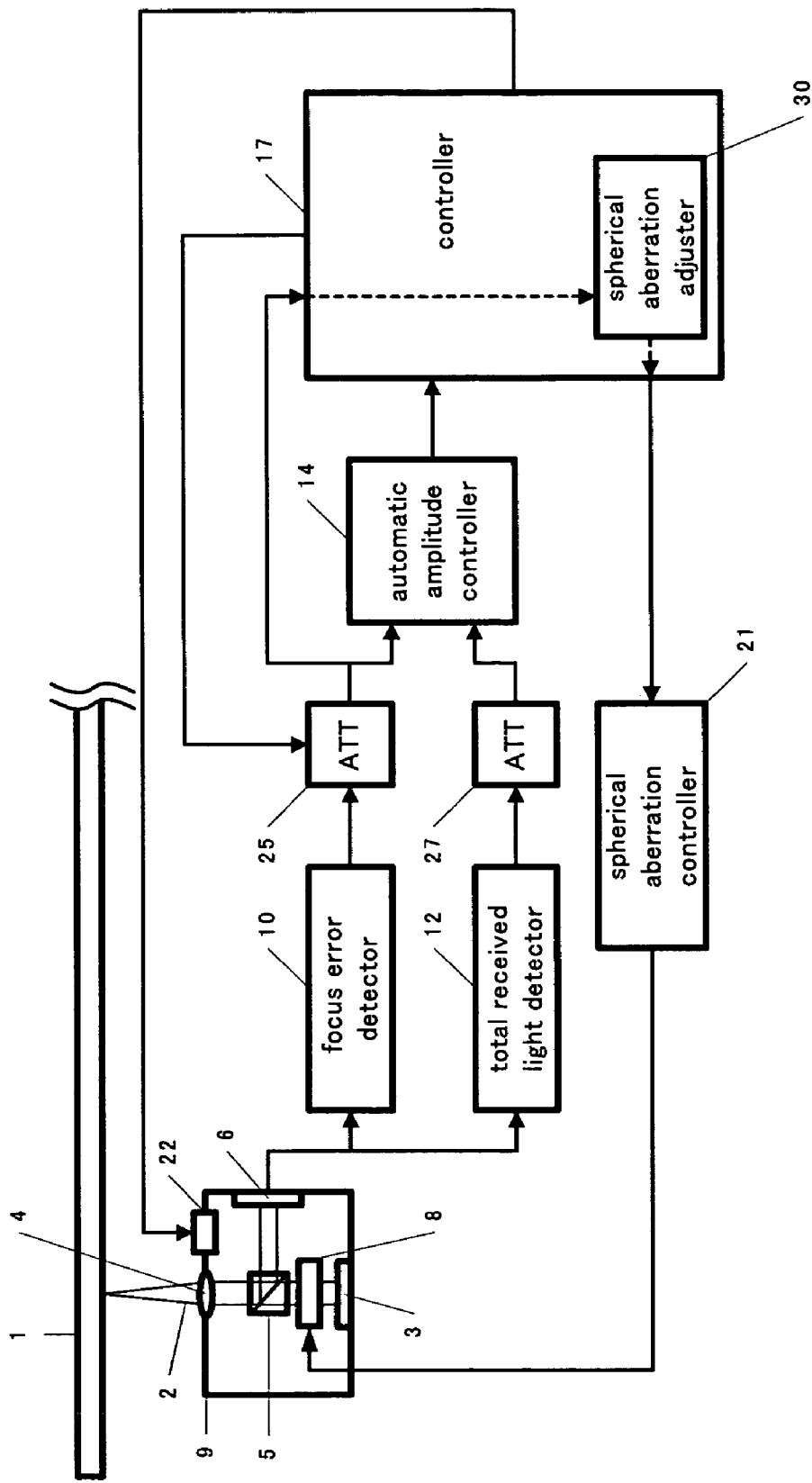
FIG. 4 is a block diagram of the constitution of a modification of Embodiment 1.
Figure 5:
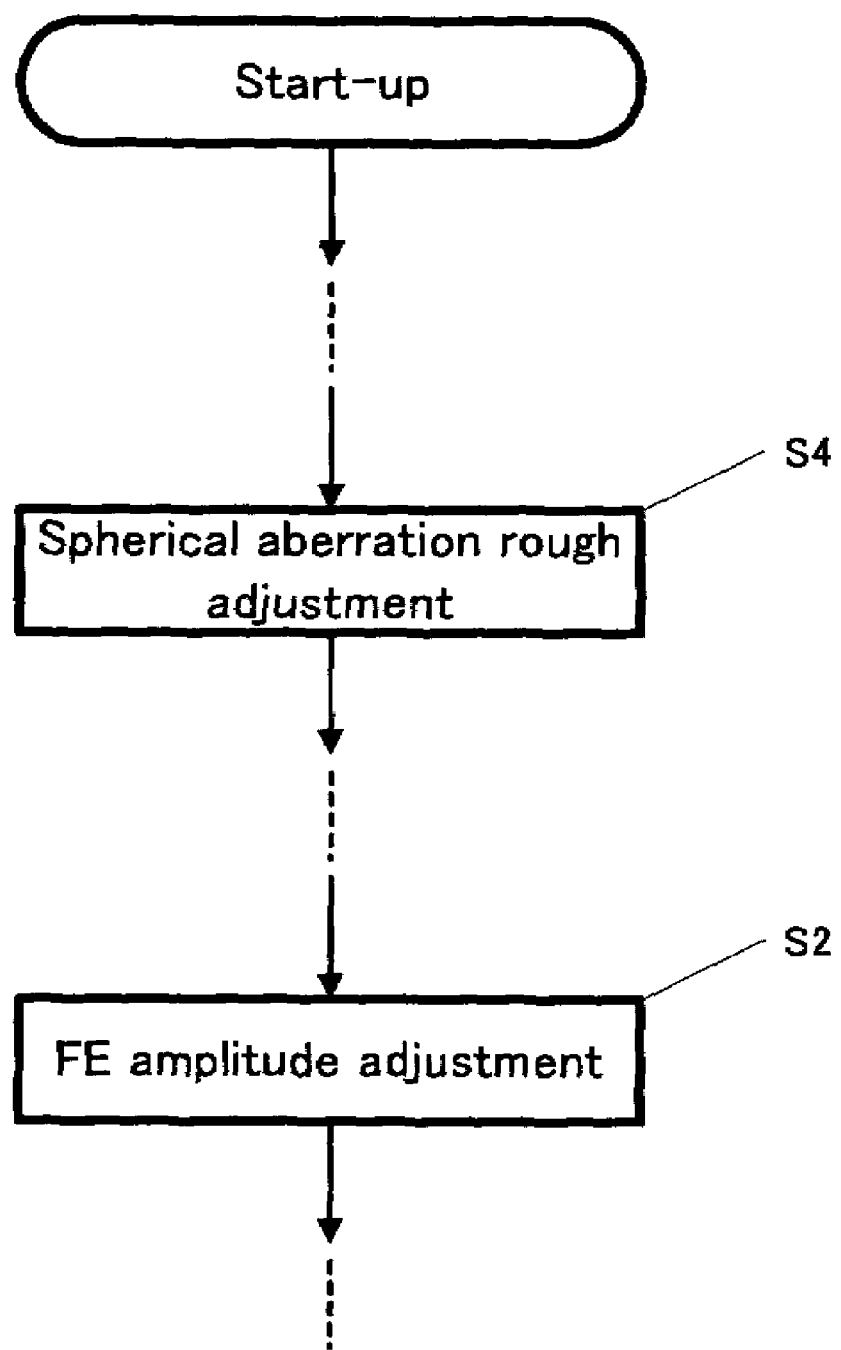
FIG. 5 is a flowchart illustrating the operation of the controller 17.

The controller 17 shown in FIG. 4 has internally a spherical aberration adjuster 30. Signals from the ATT 25 are inputted to the spherical aberration adjuster 30. Also, the spherical aberration adjuster 30 is able to adjust the spherical aberration controller 21. The controller 17 raises and lowers the objective lens by driving the focus actuator 22. As a result, the amplitude (S-shaped) of a focus error is itself sent from the ATT 25 to the spherical aberration adjuster 30. The controller 17 drives the spherical aberration element 8 through the spherical aberration controller 21 so that the focus error amplitude will be substantially at its maximum, or so that the slope near the zero cross of a tracking error will be substantially at its maximum (step S4 in FIG. 5). After this, the controller 17 sets the ATT 25 so that the signal from the focus error detector 10 will be at a constant amplitude regardless of the reflectivity of the disc 1 (step S2 in FIG. 5).

As a result, the effect of spherical aberration can be eliminated from the adjustment of the amplitude of a focus error.

Second Modification of Embodiment 1

Figure 6:
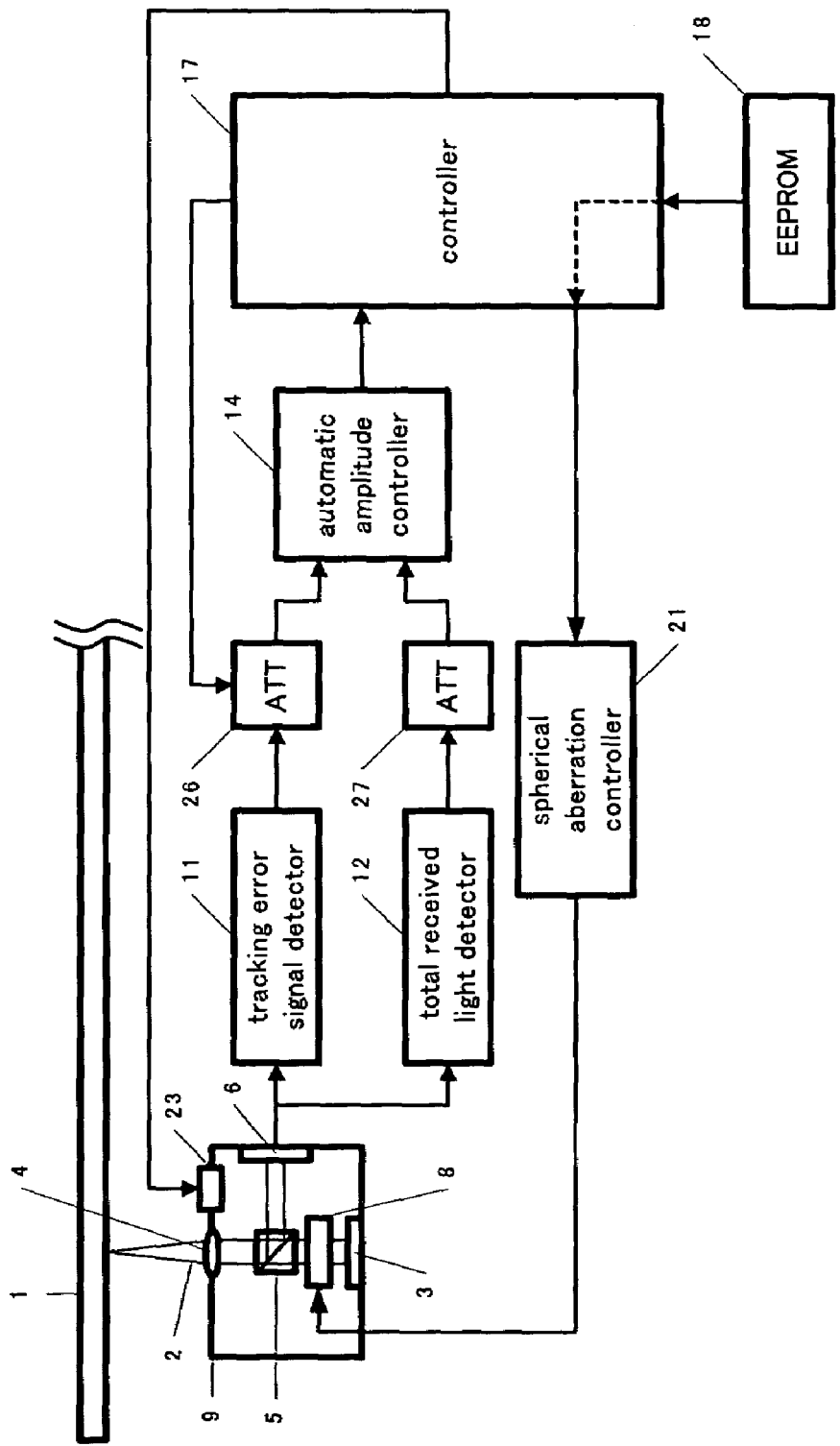
FIG. 6 is a block diagram of the constitution of Embodiment 2.

The spherical aberration rough adjustment in step S4 in the example of FIG. 1 may be performed using a signal from a tracking error detector (see FIG. 6). The controller 17 measures the tracking error signal after focusing control has been switched on, and drives the spherical aberration element 8 via the spherical aberration controller 21 so that the amplitude of this signal will substantially be at its maximum, or so that the slope of the tracking error near the zero cross will substantially be at its maximum. After this, the controller 17 sets the ATT 25 so that the signal from the spherical aberration controller 21 will have a constant amplitude, regardless of the reflectivity of the disc 1.

Third Modification of Embodiment 1

Figure 3:
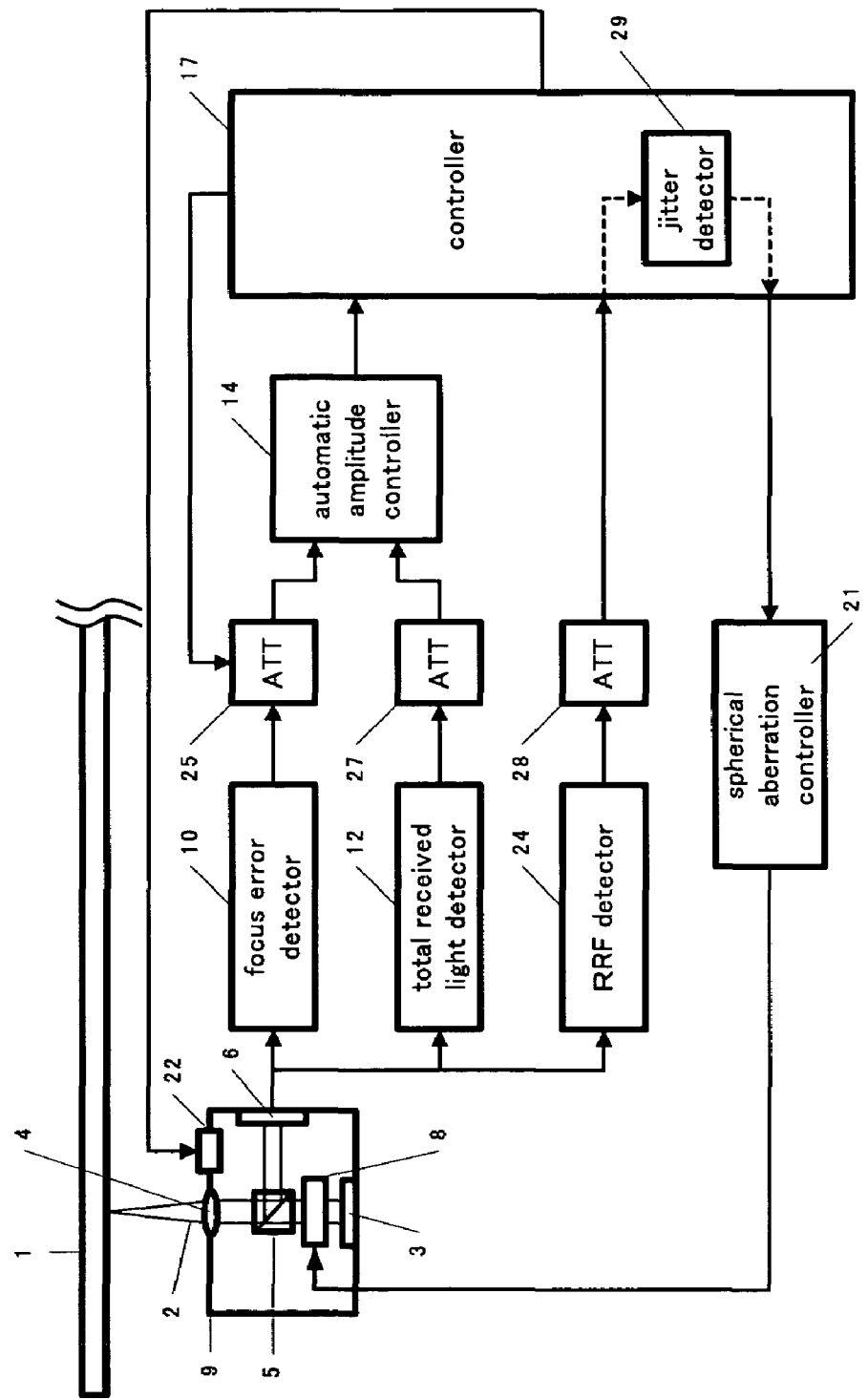
FIG. 3 is a block diagram of the constitution of a modification of Embodiment 1.

With the device shown in FIG. 3, the controller 17 has a jitter detector 29 into which are inputted signals from an ATT 38 and an RF detector 24. The RF detector 24 produces an RF signal that serves as a source signal for reproducing data. The jitter detector 29 receives from the RF detector 24 the input of a signal (RF signal) recorded on the disc 1, and uses this binarized signal to detect jitter or a signal expressing signal quality corresponding to the error rate. The controller 17 drives the spherical aberration element 8 via the spherical aberration controller 21 so that the jitter or the signal expressing signal quality will be optimal (which usually means at its minimum) (step S4 in FIG. 5). After this, the controller 17 sets the ATT 25 so that the signal from the focus error detector 10 will have a constant amplitude, regardless of the reflectivity of the disc 1 (set S2 in FIG. 5). Here again, the effect of spherical aberration on the amplitude adjustment of focus error can be eliminated.

Embodiment 2

A second embodiment will be described through reference to FIGS. 6 and 21. FIG. 6 is a block diagram of the constitution of this embodiment, while FIG. 21 is a waveform diagram illustrating the waveforms of the total amount of received light and the TE signal amplitude when the amount of spherical aberration was roughly zero and when spherical aberration had occurred.

In FIG. 6, the optical irradiation unit 3 directs a light beam 2 at an optical disc 1 and irradiates the disc at a specific power. The irradiating light beam 2 passes through the beam splitter 5 and is focused by the focusing lens 4 on the information surface of the optical disc 1. The light beam 2 reflected by the optical disc 1 is directed by the beam splitter 5 to the light receiver 6. The light receiver 6 outputs the amount of received light as a signal. An optical head 9 is made up of the optical irradiation unit 3, the focusing lens 4, the beam splitter 5, the light receiver 6, and a spherical aberration element 8. The tracking error detector 11 detects a tracking error signal (hereinafter referred to as TE signal) on the basis of the signal from the light receiver 6. The total received light detector 12 detects the total amount of received light on the basis of the signal from the light receiver 6. The signals from the focus error detector 10 and the total received light detector 12 are outputted through ATTs 26 and 27, respectively, to the automatic amplitude controller 14. When the total amount of received light changes, the automatic amplitude controller 14 automatically controls the amplitude of the TE signal based on the amount of change. That is, the automatic amplitude controller 14 controls such that the light beam will be properly operated in the radial direction on the basis of the signal from the tracking error detector 11. As a result, the TE signal amplitude is kept at a specific level even though the disc reflectivity may vary or there may be variance in the power of the light beam. The signal from the automatic amplitude controller 14 is inputted to a controller 17. The controller 17 is able to control a tracking actuator 23, the ATT 25, and a spherical aberration controller 21.

An EEP ROM (Electrically Erasable Programmable ROM) 18 can be read from the controller 17. In this EEP ROM 18 is stored, for example, a drive value determined such that when a specific optical disc of a known light transmitting layer thickness is used during the adjustment and test of the device, the spherical aberration that can occur at that light transmitting layer thickness will be substantially zero. (For example, the light transmitting layer thickness of the specific optical disc is preferably 100 or 75 µm.)

Since spherical aberration is proportional to the inverse of the wavelength and the fourth power of the NA, large spherical aberration occurs as a result of even microscopic unevenness in the light transmitting layer thickness.

Thus, as shown in FIG. 6, it is necessary to drive the spherical aberration element 8 and adjust the spherical aberration so as to match the light transmitting layer thickness of the disc. Accordingly, when the device is turned on, or when a specific command is issued from the host (not shown), the controller 17 acquires the drive value of the spherical aberration element 8 from the EEP ROM 18, and drives the spherical aberration element 8 to the specified position via the spherical aberration controller 21 (step S1 in FIG. 7). The amount of spherical aberration (that is, the drive value) is 100 µm, which is the light transmitting layer thickness of the disc. Thus, the amount of spherical aberration of the light beam 2 emitted by the irradiation unit 3 is corrected according to the output of the spherical aberration controller 21.

Figure 7:
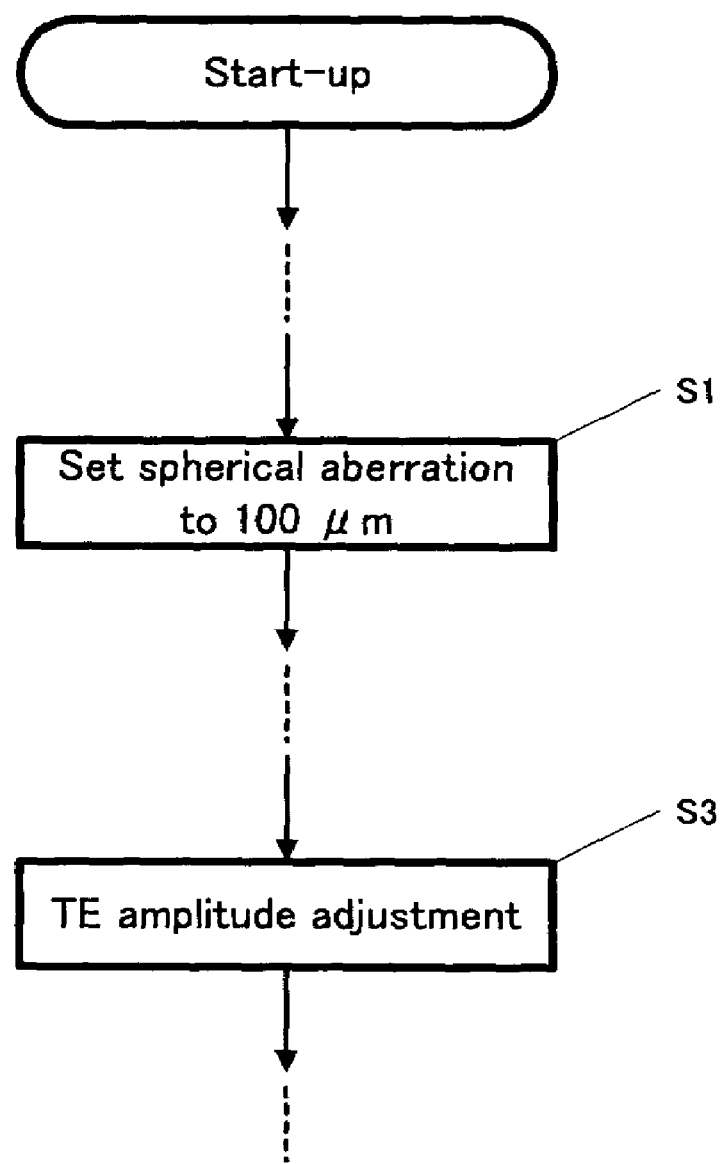
FIG. 7 is a flowchart illustrating the operation of the controller 17.

Next, the controller 17 sets the ATT 26 so that the signal from the tracking error detector 11 will have a constant amplitude regardless of the reflectivity of the disc 1 (step S2 in FIG. 7).

A modification of the first embodiment, in which no EEP ROM is used, will now be described.

First Modification Embodiment 2

Figure 9:
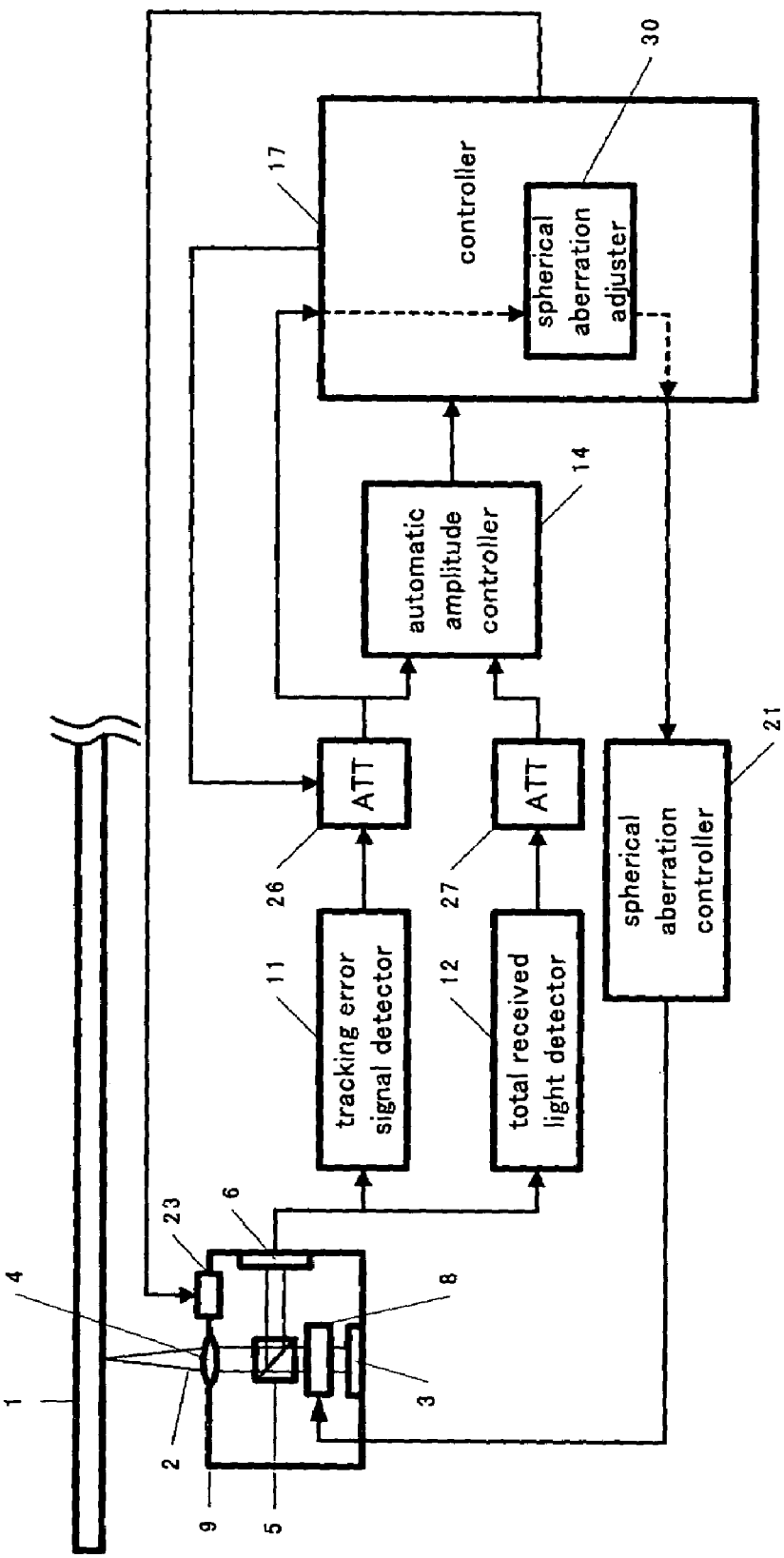
FIG. 9 is a block diagram of the constitution of a modification of Embodiment 2.
Figure 10:
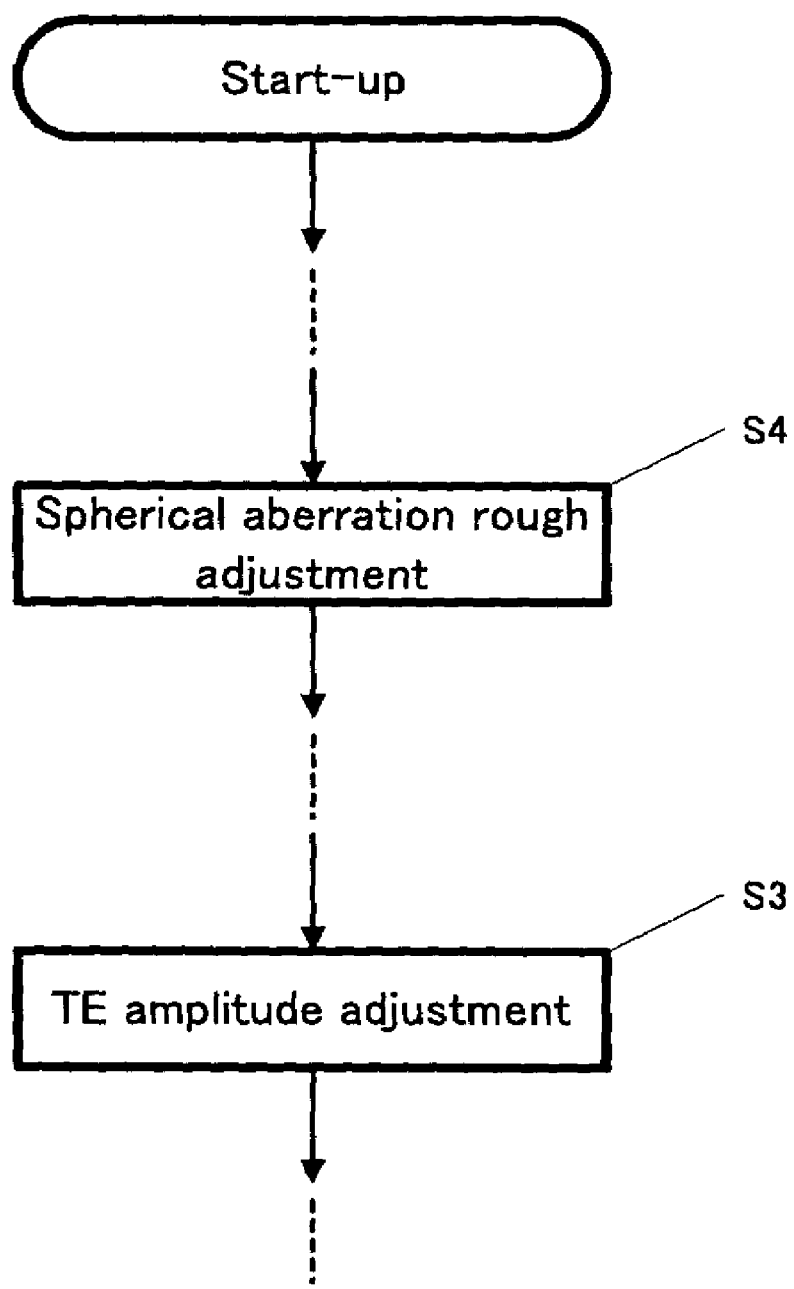
FIG. 10 is a flowchart illustrating the operation of the controller 17.

The controller 17 shown in FIG. 9 has internally a spherical aberration adjuster 30. Signals from the ATT 25 are inputted to the spherical aberration adjuster 30. Also, the spherical aberration adjuster 30 is able to adjust the spherical aberration controller 21. The controller 17 moves the objective lens in the radial direction by driving the tracking actuator 23 after focusing control has been switched on. As a result, the amplitude (S-shaped) of a tracking error is itself sent from the ATT 26 to the spherical aberration adjuster 30. The controller 17 drives the spherical aberration element 8 through the spherical aberration controller 21 so that the tracking error amplitude will be substantially at its maximum, or so that the slope near the zero cross of a tracking error will be substantially at its maximum (step S4 in FIG. 10). After this, the controller 17 sets the ATT 26 so that the signal from the tracking error detector 11 will be at a constant amplitude regardless of the reflectivity of the disc 1 (step S2 in FIG. 10).

As a result, the effect of spherical aberration can be eliminated from the adjustment of the amplitude of a tracking error.

Second Modification of Embodiment 2

The spherical aberration rough adjustment in step S4 in the example of FIG. 6 may be performed using a signal from a tracking error detector 11. The controller 17 The controller 17 raises and lowers the objective lens by driving the focus actuator, measures the focusing error signal during the operation, and drives the spherical aberration element 8 via the spherical aberration controller 21 so that the amplitude of this signal will substantially be at its maximum, or so that the slope of the focus error near the zero cross will substantially be at its maximum. After this, the controller 17 sets the ATT 26 so that the signal from the tracking error detector 11 will have a constant amplitude, regardless of the reflectivity of the disc 1.

Third Modification of Embodiment 2

Figure 8:
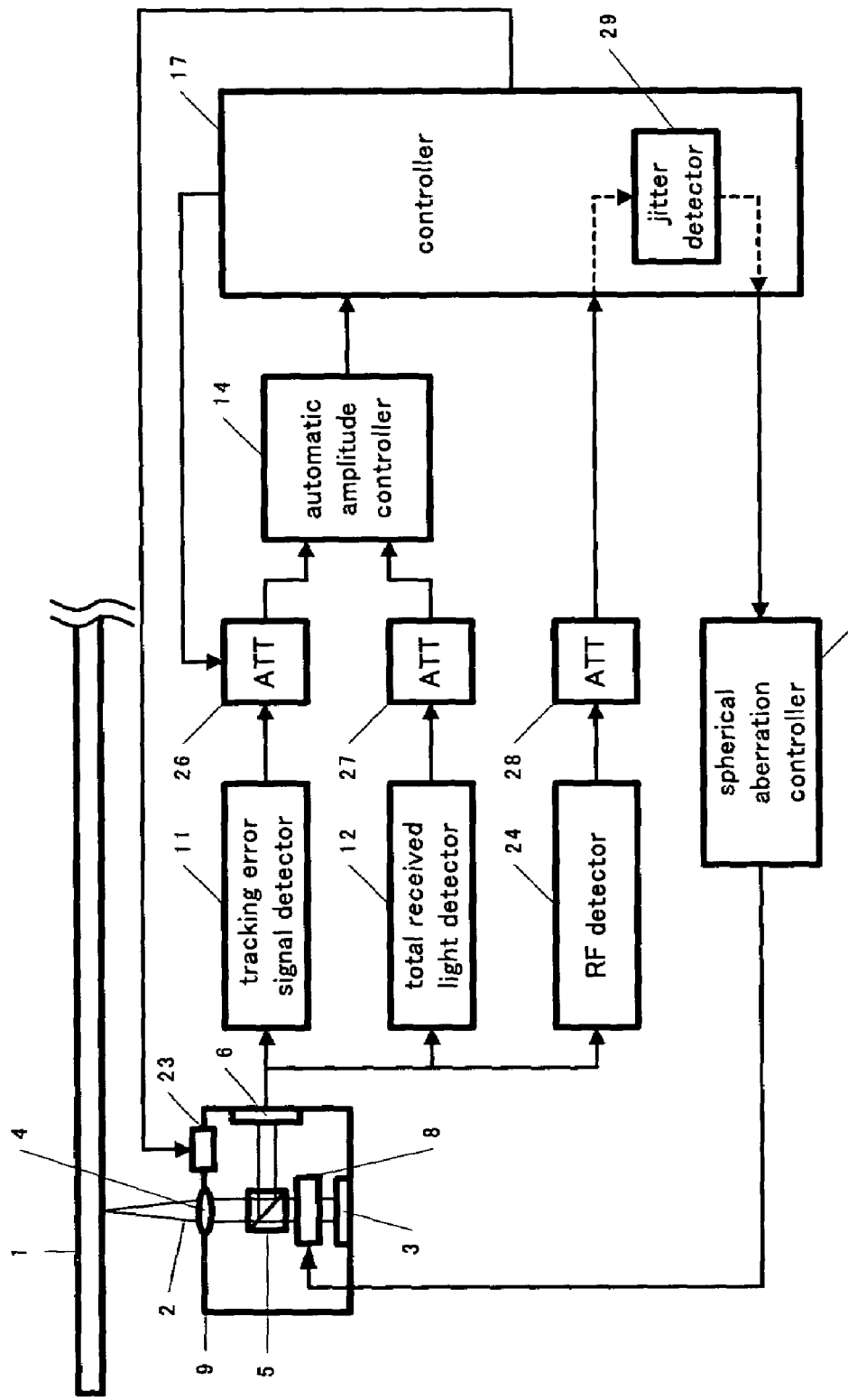
FIG. 8 is a block diagram of the constitution of a modification of Embodiment 2.

With the device shown in FIG. 8, the controller 17 has a jitter detector 29 into which are inputted signals from an ATT 28 and an RF detector 24. The RF detector 24 produces an RF signal that serves as a source signal for reproducing data. The jitter detector 29 receives from the RF detector 24 the input of a signal (RF signal) recorded on the disc 1, and uses this binarized signal to detect jitter or a signal expressing signal quality corresponding to the error rate. The controller 17 drives the spherical aberration element 8 via the spherical aberration controller 21 so that the jitter or the signal expressing signal quality will be optimal (which usually means at its minimum) (step S4 in FIG. 10). After this, the controller 17 sets the ATT 25 so that the signal from the tracking error detector 11 will have a constant amplitude, regardless of the reflectivity of the disc 1 (set S2 in FIG. 10). Here again, the effect of spherical aberration on the amplitude adjustment of tracking error can be eliminated.

Embodiment 3

The constitution in Embodiments 1 and 2 was such that after the correction of spherical aberration was performed, the gain ATT 25 or ATT26 of a detector of focus error signals or tracking error signals was directly switched so as to achieve a constant amplitude, but an even more stable device can be obtained by combining Embodiments 1 and 2.

Figure 11:
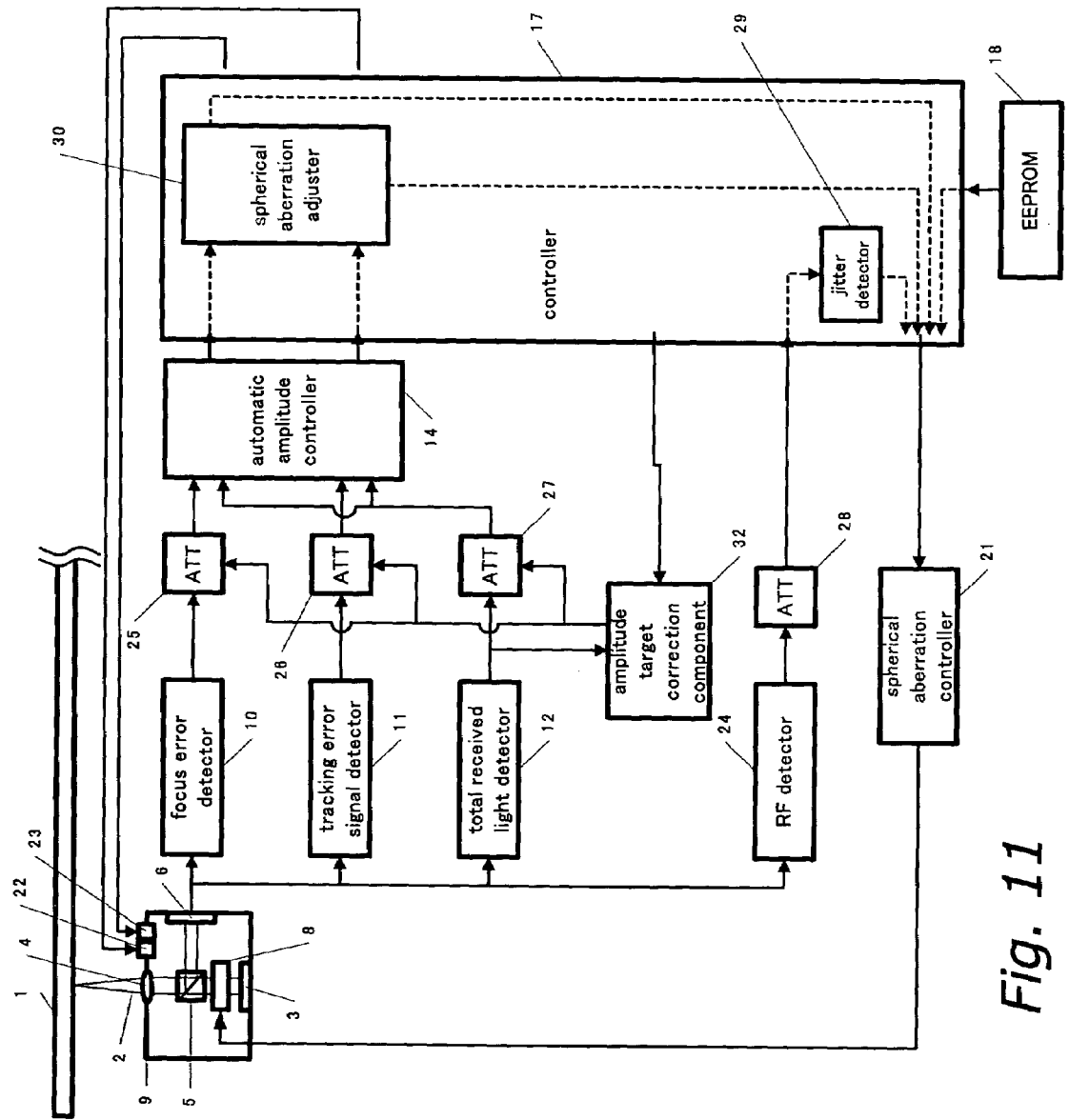
FIG. 11 is a block diagram of the constitution of a modification of Embodiment 3.
Figure 12:
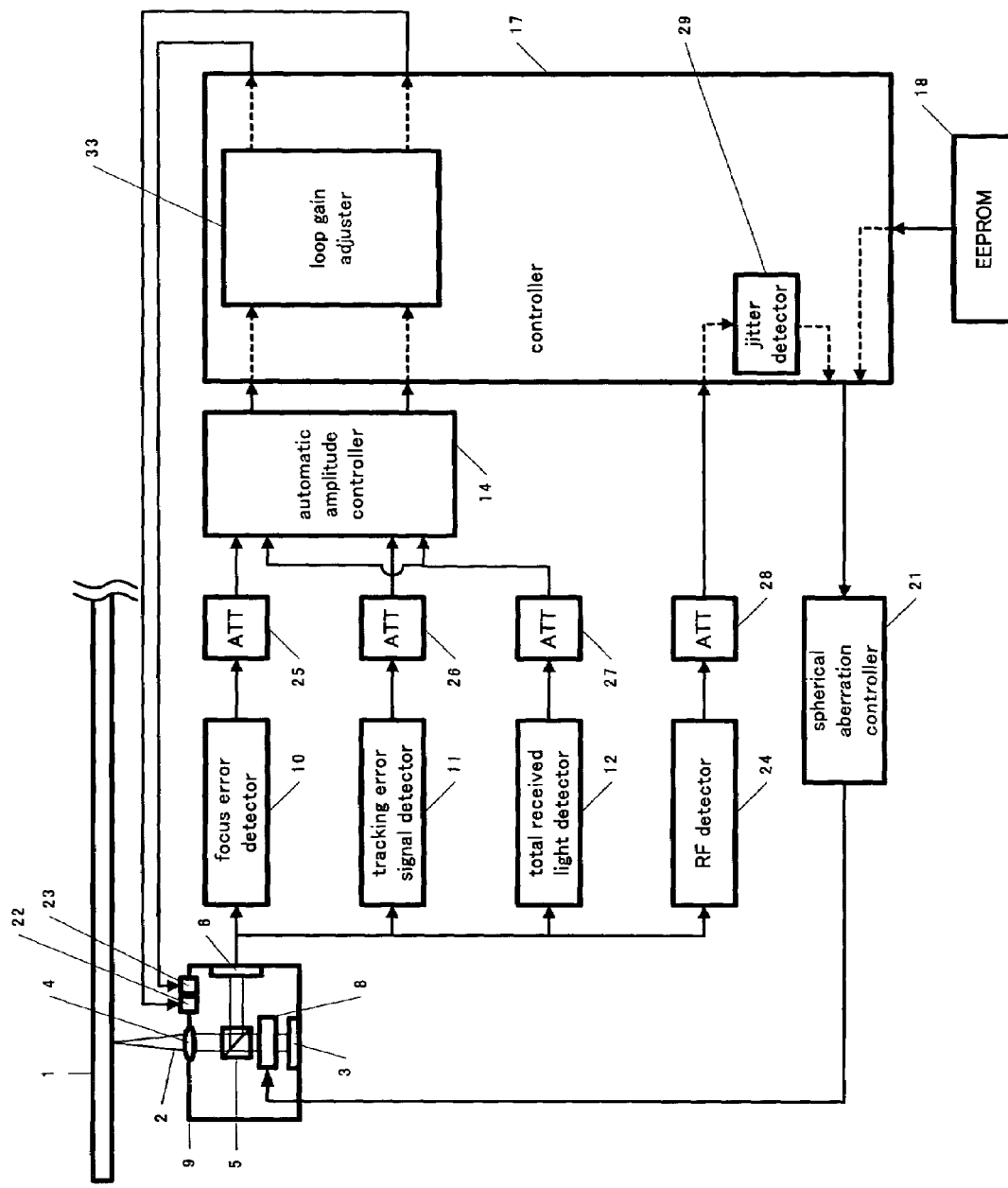
FIG. 12 is a block diagram of the constitution of a modification of Embodiment 3.

FIGS. 11 and 12 illustrate the constitution of the device in Embodiment 3. The device shown in FIG. 11 has a focus control system made up of the focus error detector 10, the ATT 25, and the automatic amplitude controller 14, and a tracking control system made up of the tracking error detector 11, the ATT 26, and the automatic amplitude controller 14. These control systems also have an amplitude target correction component 32. The amplitude target correction component 32 has an AGC function, and is able to adjust the values of the ATTs 25, 26, and 27 on the basis of the signals from the total received light detector 12. The controller 17 has the spherical aberration adjuster 30 and the jitter detector 29.

The spherical aberration correction operation performed by the device in FIG. 11 will be described. During assembly of the device, for example, the initial drive value for the optical head in order to achieve the optimal specific spherical aberration is found and stored in the EEP ROM 18. When the device is turned on, the controller 17 reads the spherical aberration initial drive value, drives the spherical aberration controller 21, and thereby initializes the spherical aberration to an initial value that matches the optical head.

Next, the controller 17 drives the spherical aberration controller 21 and thereby moves the spherical aberration element 8 to a more suitable location so as to attain the maximum slope near the zero cross or the maximum amplitude of the focus error signal incorporated into the spherical aberration adjuster 30 when the focus is moved up or down. Since the FE and AS amplitudes come within the specified range in this state, focus control can be easily pulled in by adjusting the amplitude of the focus error signal.

Next, after focus has been pulled in, the controller 17 drives the spherical aberration element 8 to a more suitable location with the spherical aberration controller 21 after the controller 17 finds such a spherical aberration that the amplitude of the tracking error signal incorporated into the spherical aberration adjuster 30 from the tracking error detector 11 through the ATT 26 and the automatic amplitude controller 14 will be at its maximum. Since the TE and AS amplitudes come within the specified range in this state, tracking control can be easily pulled in by adjusting the amplitude of the tracking error signal.

Furthermore, after tracking has been pulled in, the controller 17 drives the spherical aberration element 8 with the spherical aberration controller 21 so that the RF amplitude incorporated from the RF detector 24 via the ATT 27 will be at its maximum, or so that the jitter of the signal obtained by binarizing the RF will be detected by the jitter detector 29 and the jitter kept to its minimum.

In this state, gain can be set with good precision if the controller 17 changes the target of automatic amplitude adjustment of the amplitude target correction component 32.

Also, the amplitude adjustment illustrated in Embodiments 1 and 2 absorbs the signal amplitude variance that is generated by reflectivity variance from disc to disc, but the signal amplitude variance generated from fluctuation in the amount of reflected light occurring during or after device actuation can be absorbed by the AGC function of the amplitude target correction component 32 shown in FIG. 11.

For instance, variance occurs before the device is actuated, that is, when the disc is installed, depending on the disc film characteristics or groove parameters. Variance occurs after actuation, for example, in the recorded and unrecorded portions on a disc that makes use of a phase changing material. Accordingly, fluctuation occurs in the reflectivity in the track circumferential direction and radial direction.

Thus, the automatic amplitude adjustment target of the amplitude target correction component 32 may be changed in order to actively absorb such variance.

Further, the focusing or tracking ATT 25 or 26 may be readjusted instead.

The device shown in FIG. 12 has a loop gain adjuster 33 within the controller 17. The loop gain adjuster 33 measures and adjusts the loop gain of the focus control system and tracking control system. Signals from the automatic amplitude controller 14 are inputted to the loop gain adjuster 33. The loop gain adjuster 33 is able to drive the focus actuator 22 and a tracking actuator 23. The actuators 22 and 23 are made up of a coil and a permanent magnet. After correction of spherical aberration, the loop gain adjuster 33 performs focus and tracking gain adjustment, which reduces fluctuation in loop gain and stabilizes focus and tracking.

Figure 17:
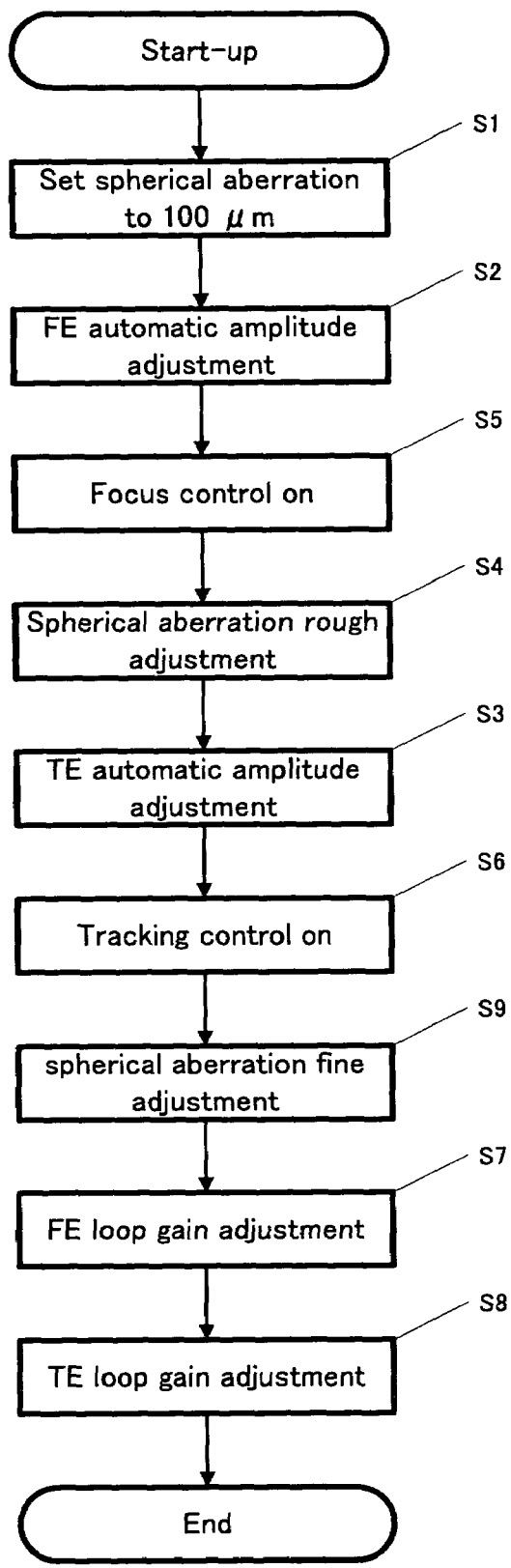
FIG. 17 is a flowchart illustrating the sequence of spherical aberration correction and automatic amplitude adjustment in the actuation procedure.

The sequence of spherical aberration correction and automatic amplitude adjustment in the actuation procedure of the device shown in FIG. 11 will be described through reference to FIG. 17.

First, the disc is rotated (not shown), after which spherical aberration or coma aberration correction is performed at the value pre-measured at the outset in the device manufacturing step or the like (S1), after which the automatic amplitude adjustment of the FE signal is performed as described in Embodiment 1 (S2). This makes it possible to pull in focus control more easily (S5).

After focus control is actuated, for example, the spherical aberration or coma aberration is fixed so that the output signal of the tracking error signal will be at its maximum (S4), after which the automatic amplitude adjustment of the tracking error signal is performed as described in Embodiment 2 (S3). This makes it possible to pull in tracking control more easily (S6).

After this, the spherical aberration is fixed so that the RF signal amplitude will be at its maximum, or the jitter of the signal obtained by binarizing this RF will be at its minimum (S9), after which the loop gain adjustment of focus control (S7) and the loop gain adjustment of tracking control (S8) are performed.

With a constitution such as this, the desired loop gain can always be achieved even if there is fluctuation in the reflectivity of the disc or variance in laser power, allowing a device to have a more stable focus control system and tracking control system.

The effects of the above processing will now be described.

1) The disc is rotated (not shown), spherical aberration or coma aberration correction is performed at the value pre-measured at the outset in the device manufacturing step or the like (S1), and then the automatic amplitude adjustment of the FE signal is performed as described in Embodiment 1 (S2). After this, the loop gain adjustment of focus control is performed (S7). Accordingly, the desired loop gain can always be achieved even if there is fluctuation in the reflectivity of the disc or variance in laser power, allowing a device to have a more stable focus control system.

2) The disc is rotated, spherical aberration or coma aberration correction is performed at the value pre-measured at the outset in the device manufacturing step or the like (S1), automatic amplitude adjustment of the TE signal is performed as described in Embodiment 2 (S3), and then the loop gain of tracking control is adjusted (S8). Accordingly, the desired loop gain can always be achieved even if there is fluctuation in the reflectivity of the disc or variance in laser power, allowing a device to have a more stable tracking control system.

By employing the above constitution, in which spherical aberration is optimally controlled at a specific timing in the device actuation sequence, after which FE and TE amplitude adjustment or loop gain adjustment is performed, it is possible to achieve stable focus and tracking even if the light transmitting layer thickness of the disc fluctuates.

Embodiment 4

Figure 15:
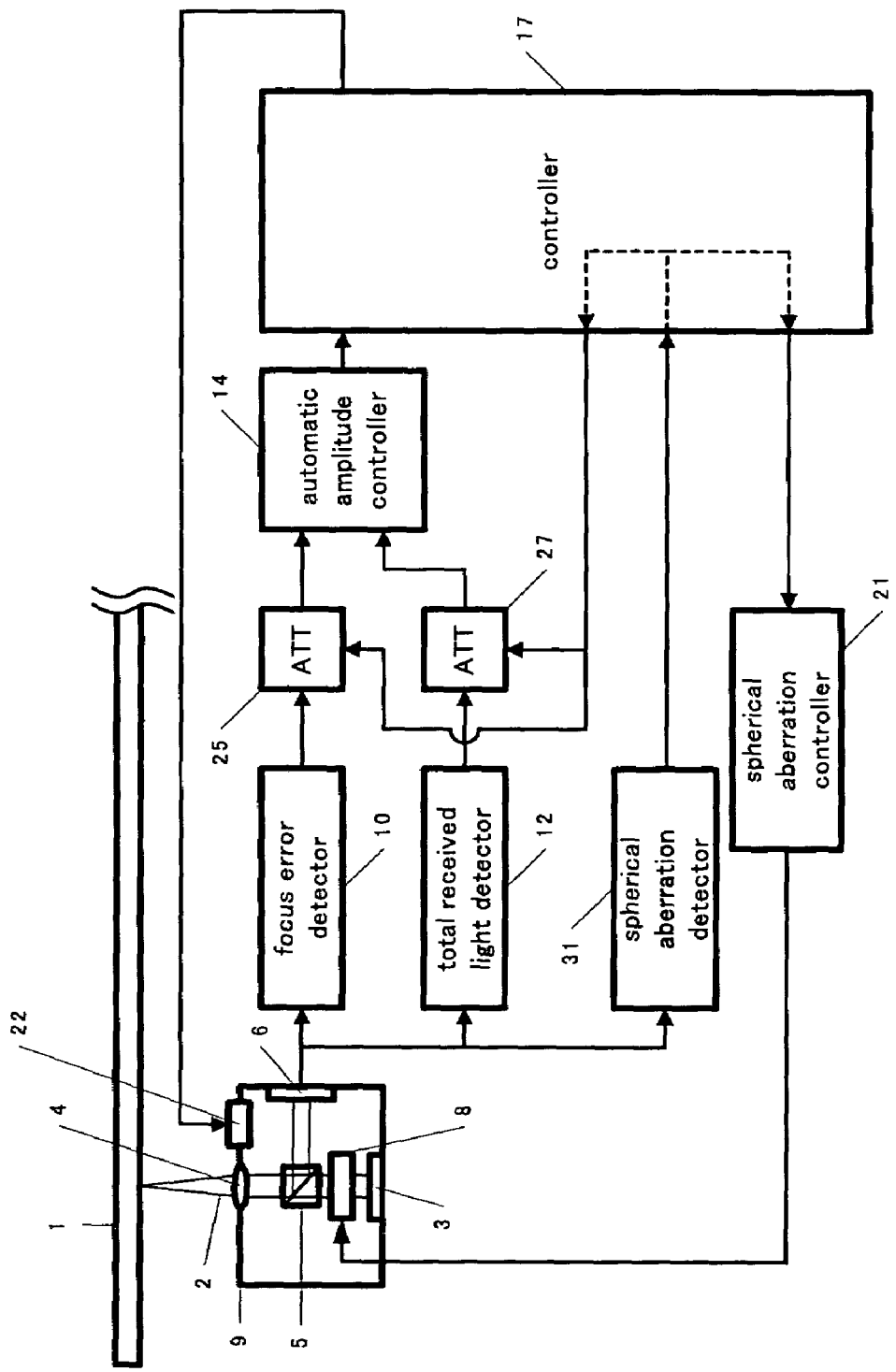
FIG. 15 is a block diagram of the constitution of a modification of Embodiment 4.

In this embodiment, spherical aberration is directly detected optically, and the spherical aberration element is driven on the basis of this detection signal, after which the focus error signal is subjected to amplitude adjustment. FIG. 15 is a block diagram illustrating this constitution. Those components that are the same as in Embodiments 2 and 3 are numbered the same and will not be described again.

Figure 14:
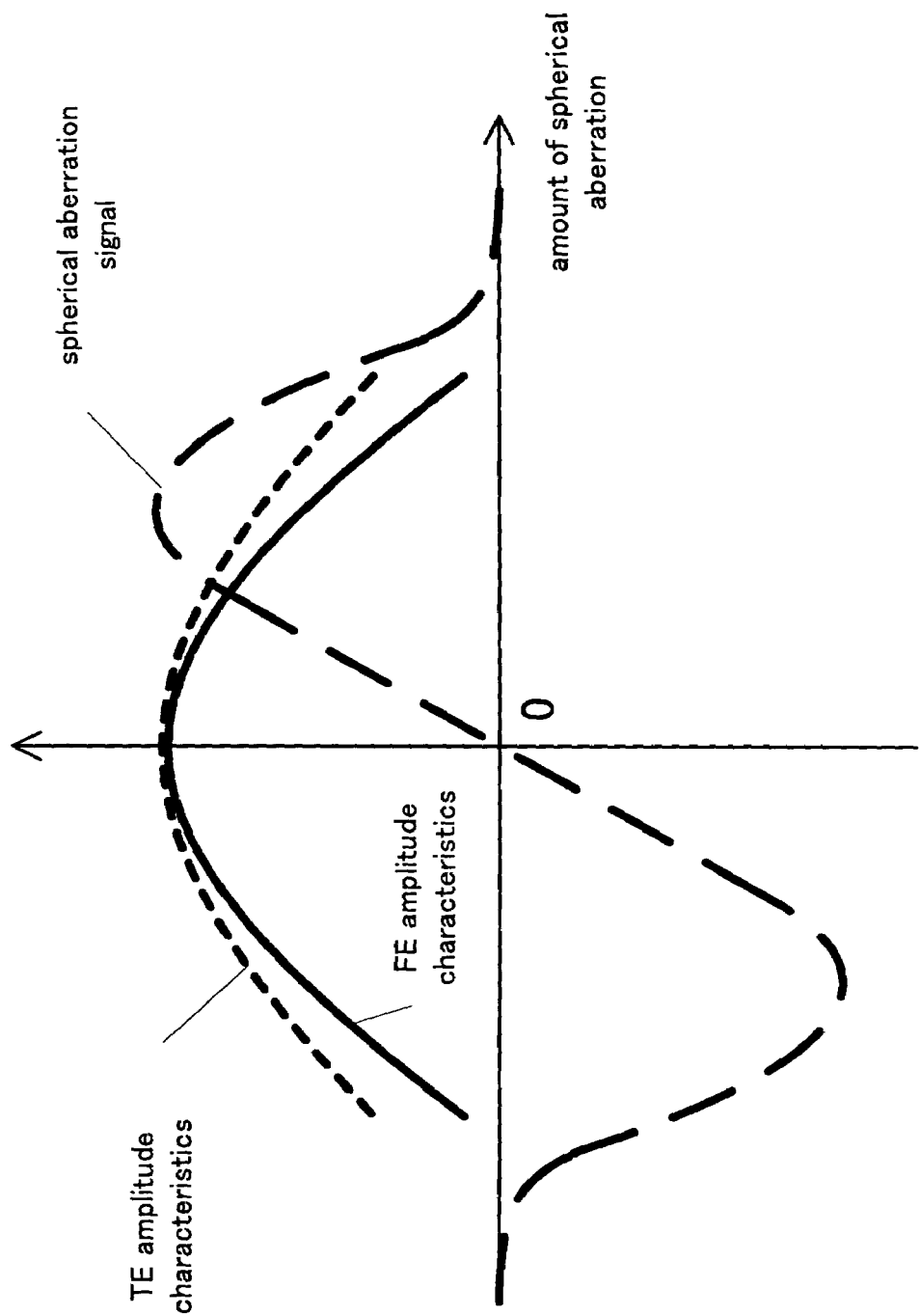
FIG. 14 is a graph of the characteristics of a spherical aberration signal.

FIG. 14 illustrates an example of the characteristics of a spherical aberration signal directly detected optically. The spherical aberration signal has the characteristic of being substantially zero when the focus error signal or tracking error signal is at its maximum amplitude.

Figure 13:
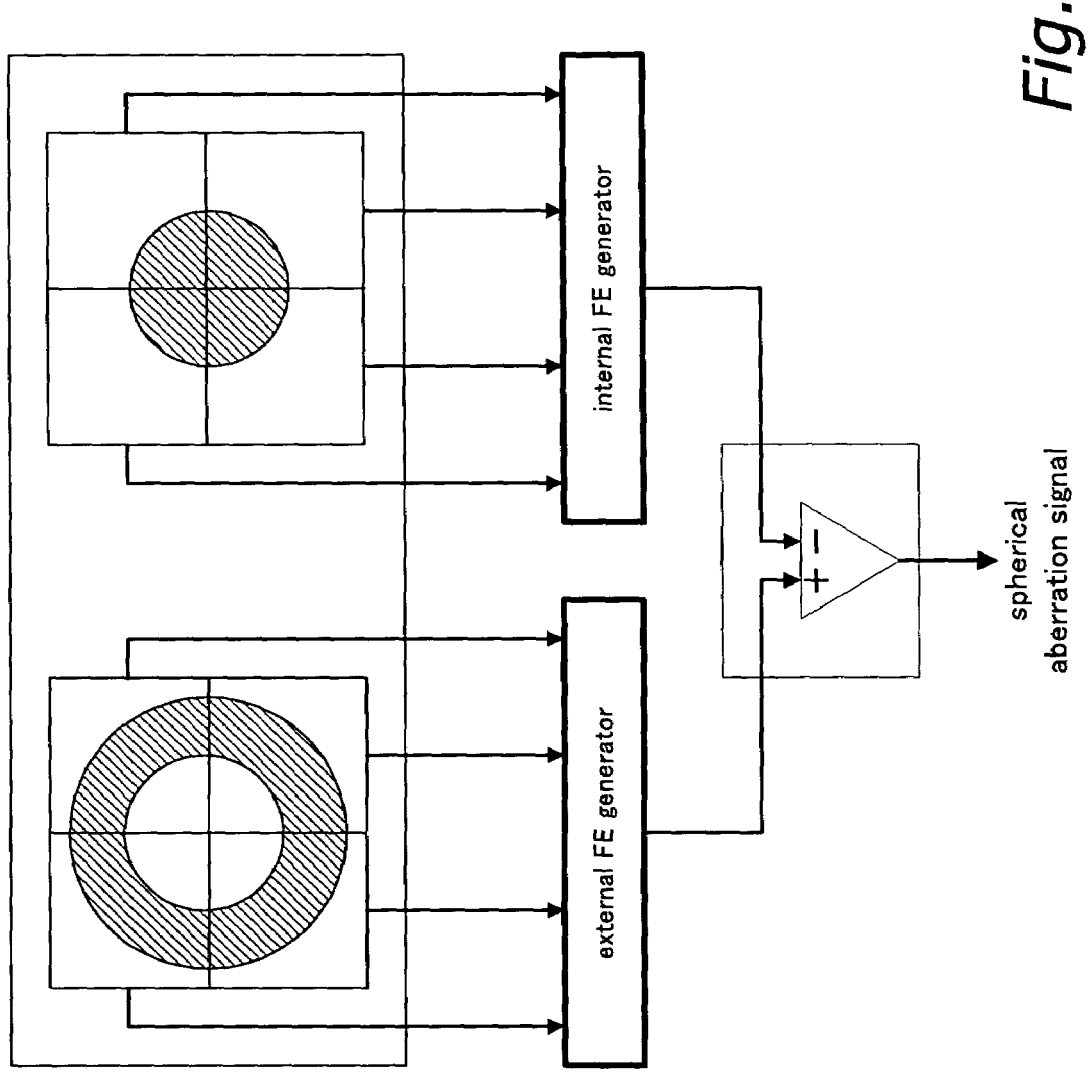
FIG. 13 is a diagram illustrating the constitution of the spherical aberration detector 31.

A spherical aberration detector 31 is provided as the means for detecting spherical aberration directly. As shown in FIG. 13, the spherical aberration detector has an external FE generator and an internal FE generator, and is designed to detect the difference in the amount of light on the inside and outside of the light beam. The spherical aberration signal that is the output of the spherical aberration detector 31 is outputted to the controller 17. This spherical aberration signal makes it possible for the controller 17 to directly detect spherical aberration on the optical disc 1. The controller 17 drives the spherical aberration element 8 via the spherical aberration controller 21 so that the value of spherical aberration will be substantially zero. After this feedback loop has been actuated, a similar effect can be obtained by performing amplitude adjustment of the focus error signal, amplitude adjustment of the tracking error signal, adjustment of the target gain of AGC in focus control, adjustment of the target gain of AGC in tracking error control, adjustment of loop gain in focus control, or adjustment of loop gain in tracking error control.

Embodiment 5

Figure 16:
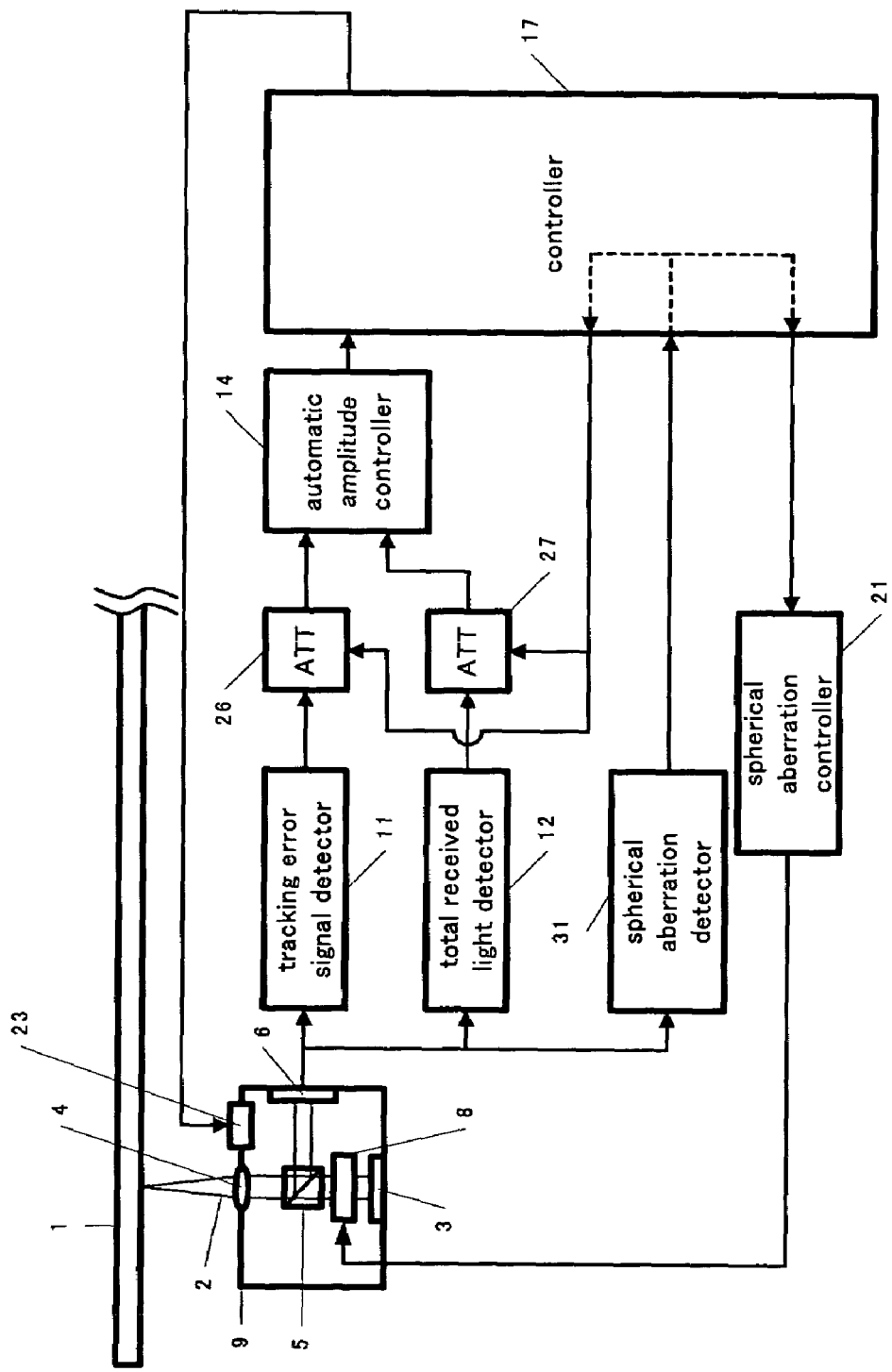
FIG. 16 is a block diagram of the constitution of a modification of Embodiment 4.

In this embodiment, spherical aberration is directly detected optically, and the spherical aberration element is driven on the basis of this detection signal, after which the tracking error signal is subjected to amplitude adjustment. FIG. 16 is a block diagram illustrating this constitution.

There are no restrictions whatsoever on the method for detecting spherical aberration or the constitution of the correction element in Embodiments 1 to 5.

Embodiment 6

Figure 24:
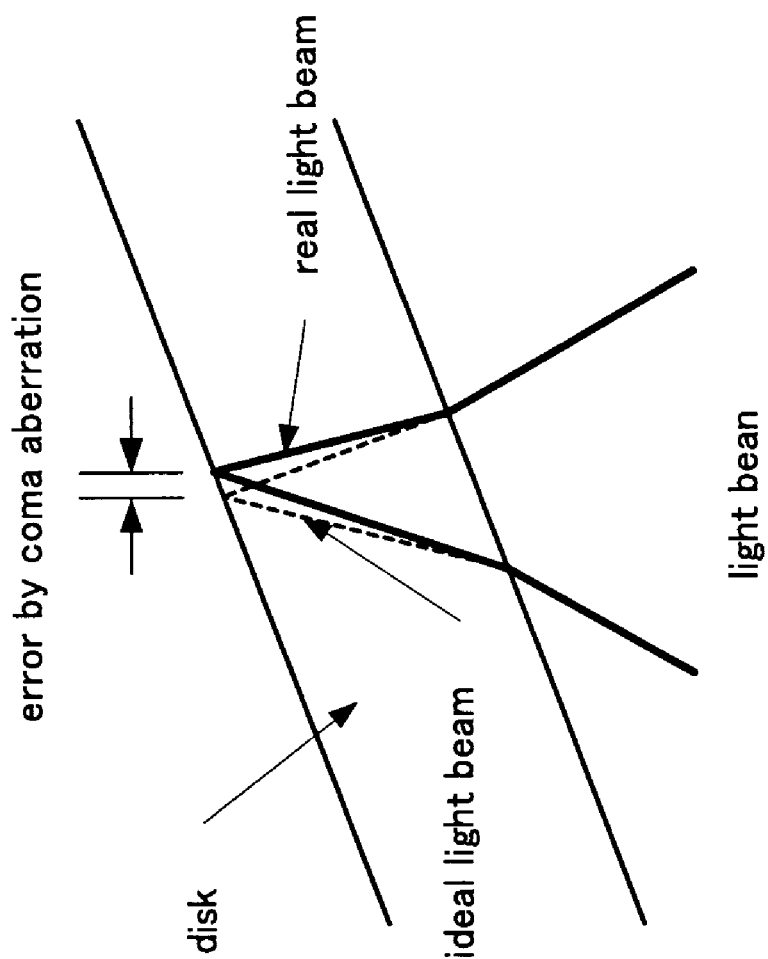
FIG. 24 is a diagram illustrating a coma aberration generated by tilting of disc.

If tilt of the optical disc is caused by warping, sag, or the like in the disc, or if there is variance in the optical component precision, coma aberration, rather than spherical aberration, will occur in the beam on the optical disc. Especially, as shown in FIG. 24, when tilt occurs at the disc, the length of the light path of the incident light of the light beam is altered so that the coma aberration is generated on the light beam spot.

Figure 18:
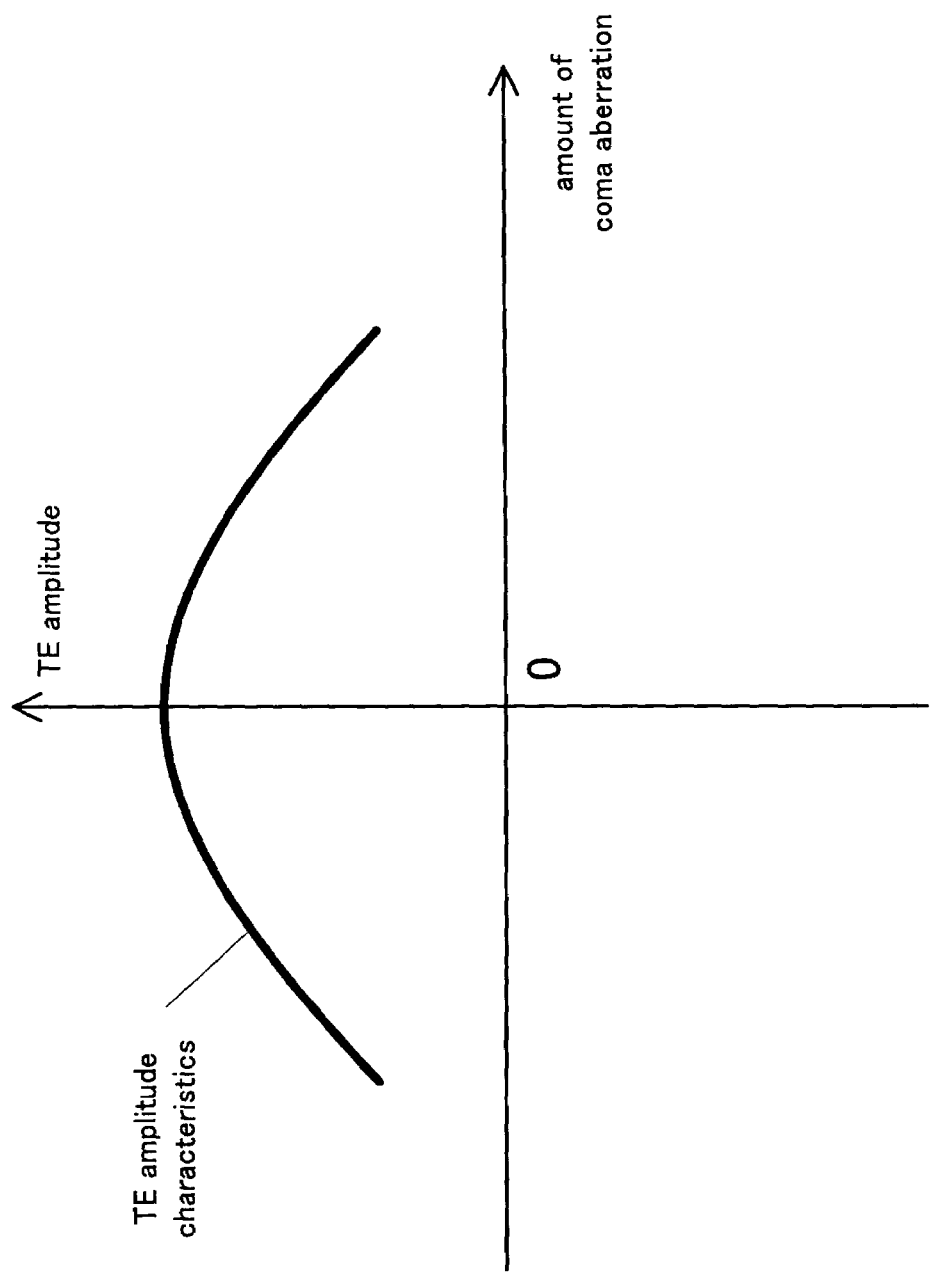
FIG. 18 is a graph of TE amplitude characteristics.

If we take into account its direction of generation and higher-order diffracted light, coma aberration, just like spherical aberration, affects the TE amplitude or FE signal amplitude as shown in FIG. 18, and is a cause of fluctuation in the loop gain of the servo system.

Thus, Embodiments 1 to 5 are similarly applied to this case as well. That is, after coma aberration is corrected, the spherical aberration element is driven. After this feedback loop has been actuated, a similar effect can be obtained by performing amplitude adjustment of the focus error signal, amplitude adjustment of the tracking error signal, adjustment of the target gain of AGC in focus control, adjustment of the target gain of AGC in tracking error control, adjustment of loop gain in focus control, or adjustment of loop gain in tracking error control.

Figure 19:
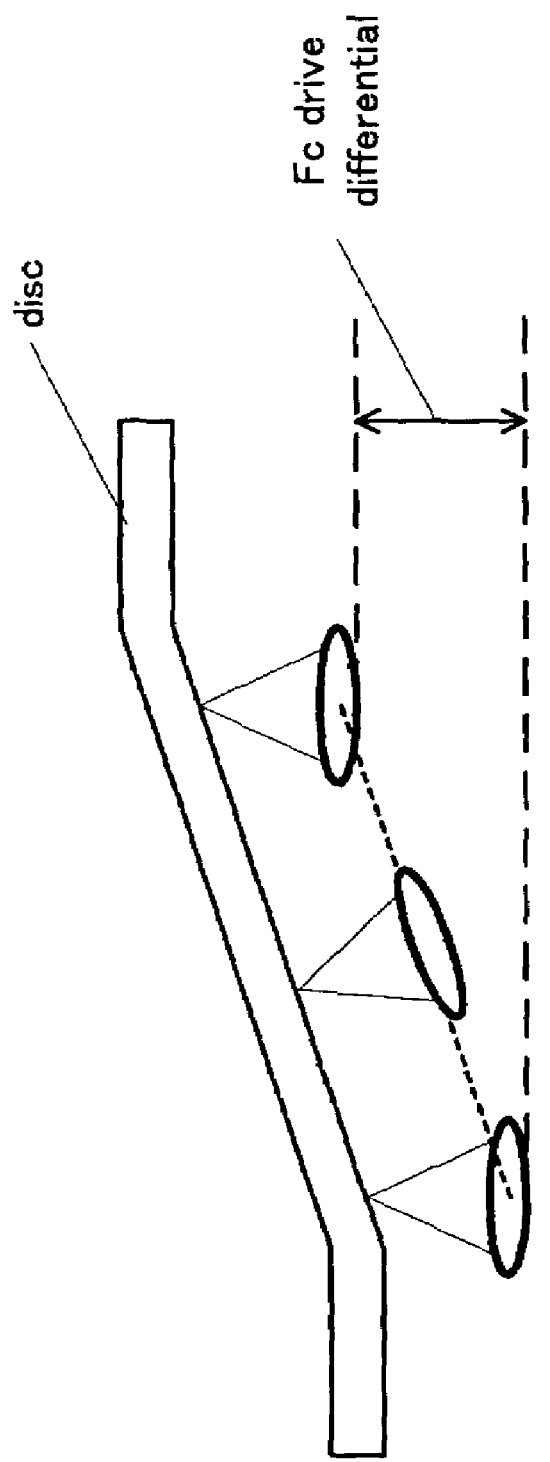
FIG. 19 is a diagram illustrating the relationship between the tilt of the disc and the drive of the lens.

Tilt of the disc is particularly dominant in coma aberration. Accordingly, the tilt of the lens in FIG. 19 is found from the height of the lens (that is, the focus drive value), and the lens is driven so as to match the inclination of the disc. This allows the above-mentioned control to be accomplished with ease.

Embodiment 7

FIG. 22 is a schematic of a lens and disc after interlayer movement with a two-layer disc, as has been proposed with the Blu-ray disc (the next-generation optical disc), and which has already been standardized as DVD. FIG. 22a is a waveform diagram of a signal indicating the lens position, FIG. 22b is a waveform diagram of a focus drive signal, FIG. 22c is a waveform diagram of a spherical aberration drive signal, and FIG. 22d is a waveform diagram of the on/off switching of automatic amplitude control.

Figure 22A:
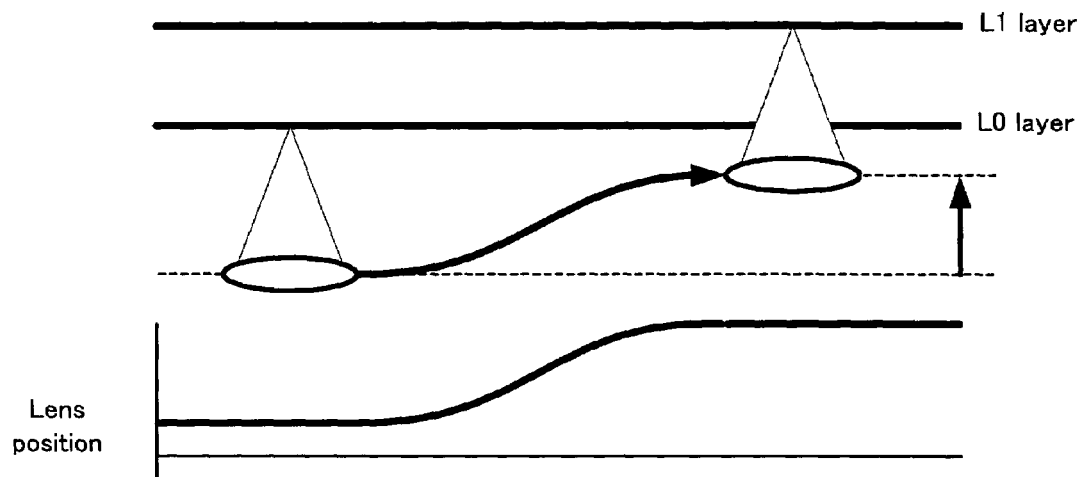
FIG. 22 is a diagram illustrating interlayer movement.
Figure 22B:
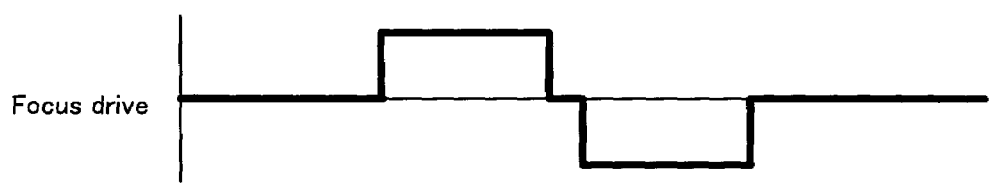

With a two-layer disc, in a state in which recording or reproduction is being performed at a first layer L0, the spherical aberration is adjusted according to the thickness of the L0 layer. When the process then moves on to the L1 layer, tracking control is momentarily turned off, and focus control is held, after which the drive pulse shown in FIG. 22b is applied to the focus control system, and the focusing lens is moved from L0 to L1.

Figure 22C:

The spherical aberration controller at this point operates so as to conform to the spherical aberration corresponding to the L1 layer as shown in FIG. 22c.

The spherical aberration drive element here is most often an ordinary stepping motor or liquid crystal element, and the spherical aberration will not be in the optimal state even after the light beam spot has been completely moved to L1 by the objective lens actuator, which is made up of a voice coil as discussed above. Therefore, when tracking control and automatic amplitude control are both turned on in this state, correction is performed in a state in which the spherical aberration has shifted, and thereafter the loop gain of focus control will increase as spherical aberration follows this shift.

Figure 22D:
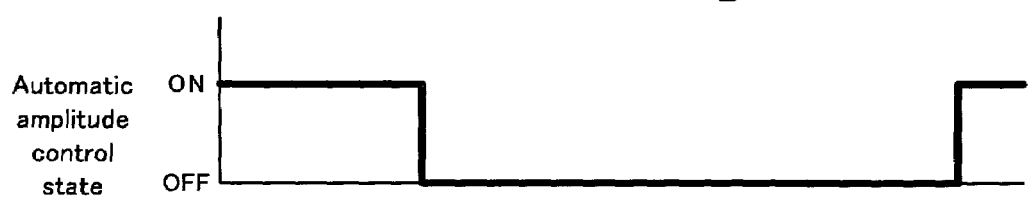
Figure 23:
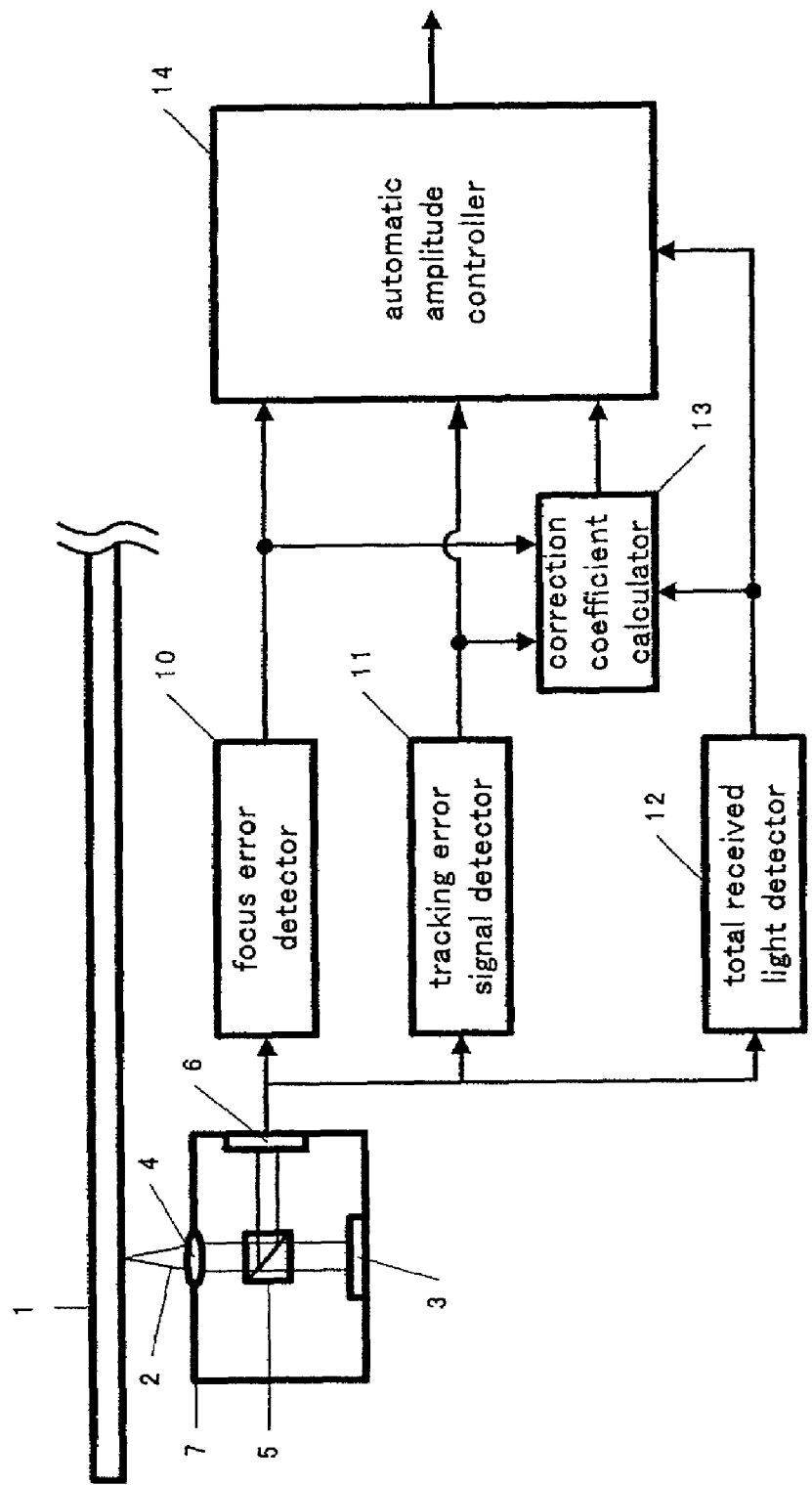
FIG. 23 is a diagram of the constitution of a conventional optical disc device.

Thus, as shown in FIG. 22d, interlayer jump will be extremely stable if automatic amplitude control is actuated after the light beam moves from L0 to L1 and spherical aberration has sufficiently followed. Also, a two-layer disc was used as an example in Embodiment 7, but the present invention can also be applied to a multilayer disc of more than two layers, such as three or four layers.

The present invention involves actuating AGC for a specific amplitude after correcting spherical aberration and establishing the FE and TE amplitude, and is therefore useful with discs with two or more layers, and particularly next-generation high-precision disc drives that make use of blue lasers and lenses with a large NA, and is particularly effective in terms of stabilizing focus control and tracking control when stabilizing jump between layers in two-layer media or when there is fluctuation in reflectivity between recorded and unrecorded portions of a recording system disc.

This application claims priority to Japanese Patent Application No. 2004-127801. The entire disclosure of Japanese Patent Application No. 2004-12801 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An optical disc device that performs recording and reproduction with a focusing lens applying a light beam to an information surface of an information medium that has been surface coated with a light transmitting layer, comprising:
    a storage unit operable to store information of a drive value which makes spherical aberration that can occur due to the light transmitting layer become zero;
    a spherical aberration correction unit having a spherical aberration correction element and operable to pre-correct spherical aberration occurring in the light beam by driving the spherical aberration correction element based on the drive value information;
    a focus detection unit operable to detect a focus error signal corresponding to the focal state of the light beam on the information medium;
    a focus error signal gain adjustment unit operable to adjust a gain of the focus error signal and output the focus error signal the gain of which has been adjusted as an adjusted focus error signal;
    a total optical quantity detection unit operable to detect an AS signal corresponding to the total quantity of light from an optical disc;
    an automatic amplitude control unit operable to automatically control the amplitude of the adjusted focus error signal based on the AS signal and the adjusted focus error signal, and output the automatically amplitude controlled signal as an AGC focus error signal;
    a focusing lens drive unit operable to drive the focusing lens; and
    a control unit operable to set a gain value for gain adjustment by the focus error signal gain adjustment unit and to execute focus control by driving the focusing lens drive unit,
    wherein, after the spherical aberration correction unit corrects spherical aberration occurring in the light beam, the control unit pulls in focus control by executing gain adjustment of the focus error signal gain adjustment unit so as to keep an amplitude value of the adjusted focus error signal constant irrespective of a reflectivity of the optical disc, and adjusting the amplitude of the focus error signal.

2. The optical disc device according to claim 1, further comprising a reproduction signal amplitude detection unit operable to detect an amplitude of an information reproduction signal that has already been recorded on the information medium,
    wherein the spherical aberration correction unit corrects spherical aberration so as to maximize a signal from the reproduction signal amplitude detection unit when the optical disc device starts.

3. The optical disc device according to claim 1, further comprising a reproduction signal jitter detection unit operable to detect jitter in an information reproduction signal that has already been recorded on the information medium,
wherein the spherical aberration correction unit corrects spherical aberration so as to optimize the signal from the reproduction signal jitter detection unit when the optical disc device starts.

4. The optical disc device according to claim 1, further comprising a binarization unit operable to binarize an information reproduction signal that has already been recorded on the information medium, and an error detection unit operable to detect a bit error in the binarized reproduction signal, or a signal corresponding to this bit error,
wherein the spherical aberration correction unit corrects spherical aberration on the basis of the signal from the error detection unit when the optical disc device starts.

5. The optical disc device according to claim 1, further comprising a tracking detection unit operable to detect a tracking error signal corresponding to positional error between a track and the light beam on the information medium,
wherein the spherical aberration correction unit corrects spherical aberration when the optical disc device starts, so as to maximize the signal amplitude or the slope near the zero cross of the tracking error signal detected by the tracking detection unit is.

6. The optical disc device according to claim 1, wherein with a multilayer disc including two or more layers of information surfaces, the correction of spherical aberration is performed by the spherical aberration correction unit for each layer.

7. The optical disc device according to claim 1, wherein
the optical disc device is a device for recording and reproduction on an information medium having two or more layers of information surfaces, and
the focus error gain adjustment unit does not start operation for adjusting the amplitude of the focus error signal to a specific amplitude before the amount of spherical aberration occurring in the light beam is adjusted to a specific range when the light beam jumps to the layers.

8. An optical disc device that performs recording and reproduction with a focusing lens applying a light beam to an information surface of an information medium that has been surface coated with a light transmitting layer, comprising:
a focus detection unit operable to detect a focus error signal corresponding to a focal state of the light beam on the information medium;
a focus error signal gain adjustment unit operable to adjust a gain of the focus error signal and output the focus error signal the gain of which has been adjusted as an adjusted focus error signal;
a total optical quantity detection unit operable to detect an AS signal corresponding to the total quantity of light from an optical disc;
an automatic amplitude control unit operable to automatically control the amplitude of the adjusted focus error signal based on the AS signal and the adjusted focus error signal, and operable to output the automatically amplitude controlled signal as an AGC focus error signal;
a spherical aberration correction unit operable to correct spherical aberration occurring in the light beam so as to maximize the amplitude of the adjusted focus error signal;
a focusing lens drive unit operable to drive the focusing lens; and
a control unit operable to set a gain value for the gain adjustment by the focus error signal gain adjustment unit and operable to perform focus control by driving the focusing lens drive unit,
wherein, after the spherical aberration correction unit corrects spherical aberration occurring in the light beam so as to maximize the amplitude of the adjusted focus error signal, the control unit pulls in focus control by executing gain adjustment of the focus error signal gain adjustment unit so as to keep an amplitude value of the adjusted focus error signal constant irrespective of a reflectivity of the optical disc, and adjusting the amplitude of the focus error signal.

9. An optical disc device that performs recording and reproduction with a focusing lens applying a light beam to an information surface of an information medium that has been surface coated with a light transmitting layer, comprising:
a focus detection unit operable to detect a focus error signal corresponding to a focal state of the light beam on the information medium;
a focus error signal gain adjustment unit operable to adjust a gain of the focus error signal, and operable to output the gain adjusted focus error signal the gain of which has been adjusted as an adjusted focus error signal;
a total optical quantity detection unit operable to detect an AS signal, which is a signal corresponding to the total quantity of light from an optical disc;
an automatic amplitude control unit operable to automatically control the amplitude of the adjusted focus error signal based on the AS signal and the adjusted focus error signal, and operable to output the automatically amplitude controlled signal as an AGC focus error signal;
a spherical aberration correction unit operable to correct spherical aberration occurring in the light beam so as to maximize a slope near the zero cross of the adjusted focus error signal;
a focusing lens drive unit operable to drive the focusing lens; and
a control unit operable to set a gain value for the gain adjustment by the focus error signal gain adjustment unit and operable to perform focus control by driving the focusing lens drive unit,
wherein, after the spherical aberration correction unit corrects spherical aberration occurring in the light beam so as to maximize the slope near the zero cross of the adjusted focus error signal, the control unit pulls in focus control by executing gain adjustment of the focus error signal gain adjustment unit so as to keep an amplitude value of the adjusted focus error signal constant irrespective of a reflectivity of the optical disc, and adjusting the amplitude of the focus error signal.

10. The optical disc device according to claim 1, wherein
the spherical aberration correction unit corrects spherical aberration occurring in the light beam when the optical disc device starts,
the control unit includes a focus gain adjustment unit operable to measure and adjust a loop gain of a focus control system of the optical disc device, and
the focus gain adjustment unit measures and adjusts the loop gain after the correction is ended by the spherical aberration correction unit when the optical disc device starts.

11. A focus adjusting method for use in an optical disc device that comprises a focusing lens drive unit for driving a focusing lens and performing recording and reproduction with the focusing lens applying a light beam to an information surface of an information medium that has been surface coated with a light transmitting layer, the method comprising:

storing information of a drive value which makes spherical aberration that can occur due to the light transmitting layer become zero;

pre-correcting spherical aberration occurring in the light beam by driving a spherical aberration correction element based on the drive value information;

detecting a focus error signal corresponding to a focal state of the light beam on the information medium;

adjusting a gain of the focus error signal and outputting the focus error signal the gain of which has been adjusted as an adjusted focus error signal;

detecting an AS signal, which is a signal corresponding to the total quantity of light from an optical disc;

automatically controlling the amplitude of the adjusted focus error signal based on the AS signal and the adjusted focus error signal, and outputting the automatically amplitude controlled signal as an AGC focus error signal; and performing focus control by setting a gain value for gain adjustment in the step of adjusting the gain of the focus error signal, and driving and controlling the focusing lens drive unit, wherein, in the step of performing focus control, after spherical aberration occurring in the light beam is corrected in the step of pre-correcting spherical aberration, focus control is pulled in by executing gain adjustment in the step of the focus error signal gain adjustment so as to keep an amplitude value of the adjusted focus error signal constant irrespective of a reflectivity of the optical disc, and adjusting the amplitude of the focus error signal.

12. A focus adjusting method for use in an optical disc device that comprises a focusing lens drive unit for driving a focusing lens and performs recording and reproduction with the focusing lens applying a light beam to an information surface of an information medium that has been surface coated with a light transmitting layer, the method comprising:

detecting a focus error signal corresponding to a focal state of the light beam on the information medium;

adjusting a gain of the focus error signal and outputting the focus error signal the gain of which has been adjusted as an adjusted focus error signal;

detecting an AS signal, which is a signal corresponding to the total quantity of light from an optical disc;

automatically controlling the amplitude of the adjusted focus error signal based on the AS signal and the adjusted focus error signal, and outputting the automatically amplitude controlled signal as an AGC focus error signal;

correcting spherical aberration occurring in the light beam to maximize the amplitude of the adjusted focus error signal;

performing focus control by setting a gain value for gain adjustment in the step of adjusting the gain of the focus error signal, and driving and controlling the focusing lens drive unit, wherein, in the step of performing focus control, after spherical aberration occurring in the light beam is corrected in the step of correcting spherical aberration so as to maximize the amplitude of the adjusted focus error signal, focus control is pulled in by executing gain adjustment in the focus error signal gain adjustment step so as to keep an amplitude value of the adjusted focus error signal constant irrespective of a reflectivity of the optical disc, and adjusting the amplitude of the focus error signal.

13. A focus adjusting method for use in an optical disc device that comprises a focusing lens drive unit for driving a focusing lens and performs recording and reproduction with a focusing lens applying a light beam to an information surface of an information medium that has been surface coated with a light transmitting layer, the method comprising:

detecting a focus error signal corresponding to a focal state of the light beam on the information medium;

adjusting the gain of the focus error signal and outputting the focus error signal the gain of which has been adjusted as an adjusted focus error signal;

detecting an AS signal, which is a signal corresponding to the total quantity of light from an optical disc;

automatically controlling the amplitude of the adjusted focus error signal based on the AS signal and the adjusted focus error signal, and outputting the automatically amplitude controlled signal as an AGC focus error signal;

correcting spherical aberration occurring in the light beam so as to maximize the slope near the zero cross of the adjusted focus error signal;

performing focus control by setting a gain value for gain adjustment in the step of adjusting the gain of the focus error signal, and driving and controlling the focusing lens drive unit, wherein, in the step of performing focus control, after spherical aberration occurring in the light beam is corrected in the step of correcting spherical aberration so as to substantially maximize the slope near the zero cross of the adjusted focus error signal will be substantially at its maximum, focus control is pulled in by executing gain adjustment in the focus error signal gain adjustment step so as to keep an amplitude value of the adjusted focus error signal constant irrespective of a reflectivity of the optical disc, and adjusting the amplitude of the focus error signal.

* * * * *

UNITED STATES PATENT AND TRADEMARK OFFICE
CERTIFICATE OF CORRECTION

PATENT NO.        : 7,522,485 B2
APPLICATION NO.   : 11/110833
DATED             : April 21, 2009
INVENTOR(S)       : Tooru Maruyama et al.

Page 1 of 1

It is certified that error appears in the above-identified patent and that said Letters Patent is hereby corrected as shown below:

In column 15, claim 5, line 27, "is" should be deleted.

Signed and Sealed this

Seventeenth Day of November, 2009

David J. Kappos
*Director of the United States Patent and Trademark Office*